US010545025B2

(12) United States Patent
Aist et al.

(10) Patent No.: US 10,545,025 B2
(45) Date of Patent: Jan. 28, 2020

(54) NAVIGATION SYSTEM WITH A SYSTEM INITIATED INQUIRY AND METHOD OF OPERATION THEREOF

(71) Applicant: Telenav, Inc., Santa Clara, CA (US)

(72) Inventors: Gregory Stewart Aist, Santa Clara, CA (US); Aliasgar Mumtaz Husain, Milpitas, CA (US); Casey Carter, Sunnyvale, CA (US); Shalu Grover, Sunnyvale, CA (US); Naveen Kumar Vandanapu, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 161 days.

(21) Appl. No.: 15/713,412

(22) Filed: Sep. 22, 2017

(65) Prior Publication Data

US 2019/0094034 A1 Mar. 28, 2019

(51) Int. Cl.
*G01C 21/34* (2006.01)

(52) U.S. Cl.
CPC ..... *G01C 21/3469* (2013.01); *G01C 21/3484* (2013.01)

(58) Field of Classification Search
CPC .............. G01C 21/3469; G01C 21/3484
USPC .......................................................... 701/24
See application file for complete search history.

(56) References Cited

U.S. PATENT DOCUMENTS

| 7,894,987 | B1 | 2/2011 | Tester et al. | |
| 10,018,478 | B2* | 7/2018 | van Os | G10L 21/00 |
| 2012/0287283 | A1 | 11/2012 | You | |
| 2013/0135118 | A1* | 5/2013 | Ricci | H04W 4/90 |
| | | | | 340/932.2 |
| 2014/0222436 | A1 | 8/2014 | Binder et al. | |
| 2016/0086391 | A1* | 3/2016 | Ricci | G07C 5/008 |
| | | | | 701/29.3 |
| 2016/0216130 | A1* | 7/2016 | Abramson | G01C 21/3626 |
| 2016/0223350 | A1* | 8/2016 | Lewis | G01C 21/3407 |
| 2016/0363456 | A1* | 12/2016 | Pujos | G01S 19/42 |
| 2016/0370194 | A1* | 12/2016 | Colijn | G01C 21/343 |
| 2017/0010115 | A1* | 1/2017 | Stein | G01C 21/32 |
| 2017/0016730 | A1* | 1/2017 | Gawrilow | G01C 21/30 |
| 2017/0102700 | A1* | 4/2017 | Kozak | B60W 30/00 |
| 2017/0136842 | A1* | 5/2017 | Anderson | B60K 35/00 |
| 2017/0138749 | A1* | 5/2017 | Pan | G01C 21/3438 |
| 2017/0146353 | A1* | 5/2017 | Kroeller | H04W 4/029 |
| 2017/0241791 | A1* | 8/2017 | Madigan | G08G 1/123 |
| 2017/0263120 | A1* | 9/2017 | Durie, Jr. | G08G 1/205 |
| 2017/0276492 | A1* | 9/2017 | Ramasamy | G01C 21/34 |
| 2017/0305349 | A1* | 10/2017 | Naboulsi | B60R 1/025 |

(Continued)

OTHER PUBLICATIONS

Quantimetrica, "QM1: An ultra low power voice switch" brochure, embedded world 2015 Exhibition & Conference, Feb. 24, 2015, pp. 1-3, Nuremberg, Germany.

*Primary Examiner* — Atul Trivedi
(74) *Attorney, Agent, or Firm* — Perspectives Law Group, Corp.

(57) ABSTRACT

A method of operation of a navigation system includes: detecting a trigger event based on a context information being free of an operation input satisfying a cue condition; selecting an operation mode representing a listen mode based on detecting the trigger event; identifying a message template linked to the cue condition; and generating a system initiated inquiry with a control unit based on the message template and the selection of the listen mode for presenting on a device.

20 Claims, 8 Drawing Sheets

(56) References Cited

U.S. PATENT DOCUMENTS

| | | | |
|---|---|---|---|
| 2017/0371608 A1* | 12/2017 | Wasserman | G06F 3/14 |
| 2018/0112990 A1* | 4/2018 | Fowe | G01C 21/3484 |
| 2018/0114378 A1* | 4/2018 | Slusar | G07C 5/0808 |
| 2018/0143035 A1* | 5/2018 | Ricci | B62D 15/00 |
| 2019/0094034 A1* | 3/2019 | Aist | G01C 21/3697 |
| 2019/0107406 A1* | 4/2019 | Cox | G01C 21/3469 |

* cited by examiner

US 10,545,025 B2

NAVIGATION SYSTEM WITH A SYSTEM INITIATED INQUIRY AND METHOD OF OPERATION THEREOF

TECHNICAL FIELD

The present invention relates generally to a navigation system, and more particularly to a system with a system initiated inquiry mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without a system initiated inquiry mechanism to effectively communicate with a user has become a paramount concern for the consumer. The inability to communicate with the user effectively decreases the benefit of using the tools.

Thus, a need still remains for a navigation system with a system initiated inquiry mechanism to communicate effectively for the user. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: detecting a trigger event based on a context information being free of an operation input satisfying a cue condition; selecting an operation mode representing a listen mode based on detecting the trigger event; identifying a message template linked to the cue condition; and generating a system initiated inquiry with a control unit based on the message template and the selection of the listen mode for presenting on a device.

The present invention provides a navigation system, including: a control unit for; detecting a trigger event based on a context information being free of an operation input satisfying a cue condition, selecting an operation mode representing a listen mode based on detecting the trigger event, identifying a message template linked to the cue condition, generating a system initiated inquiry based on the message template and the selection of the listen mode, and a communication interface, coupled to the control unit, for communicating the system initiated inquiry for presenting on a device.

The present invention provides a navigation system including a non-transitory computer readable medium including instructions for execution, the instructions comprising: detecting a trigger event based on a context information being free of an operation input satisfying a cue condition; selecting an operation mode representing a listen mode based on detecting the trigger event; identifying a message template linked to the cue condition; and generating a system initiated inquiry based on the message template and the selection of the listen mode for presenting on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
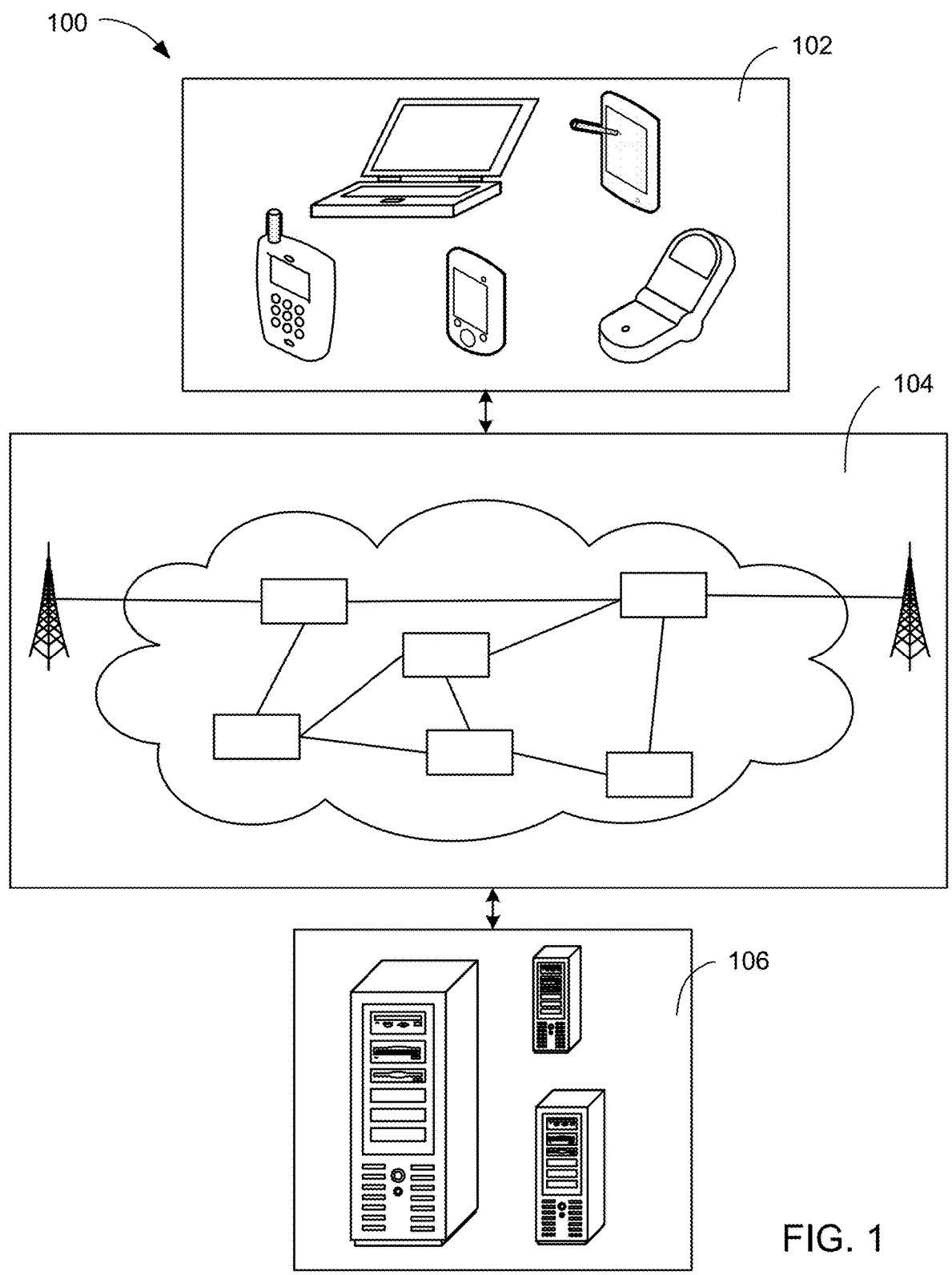
FIG. 1 is a navigation system with a communication mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with a communication mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, motorcycle, tricycle, bicycle, bus, ship, submarine, or train. The vehicle can be powered either by a motor, human, or animal. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, motorcycle, tricycle, bicycle, bus, ship, submarine, or train. The vehicle can be powered either by a motor, human, or animal.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
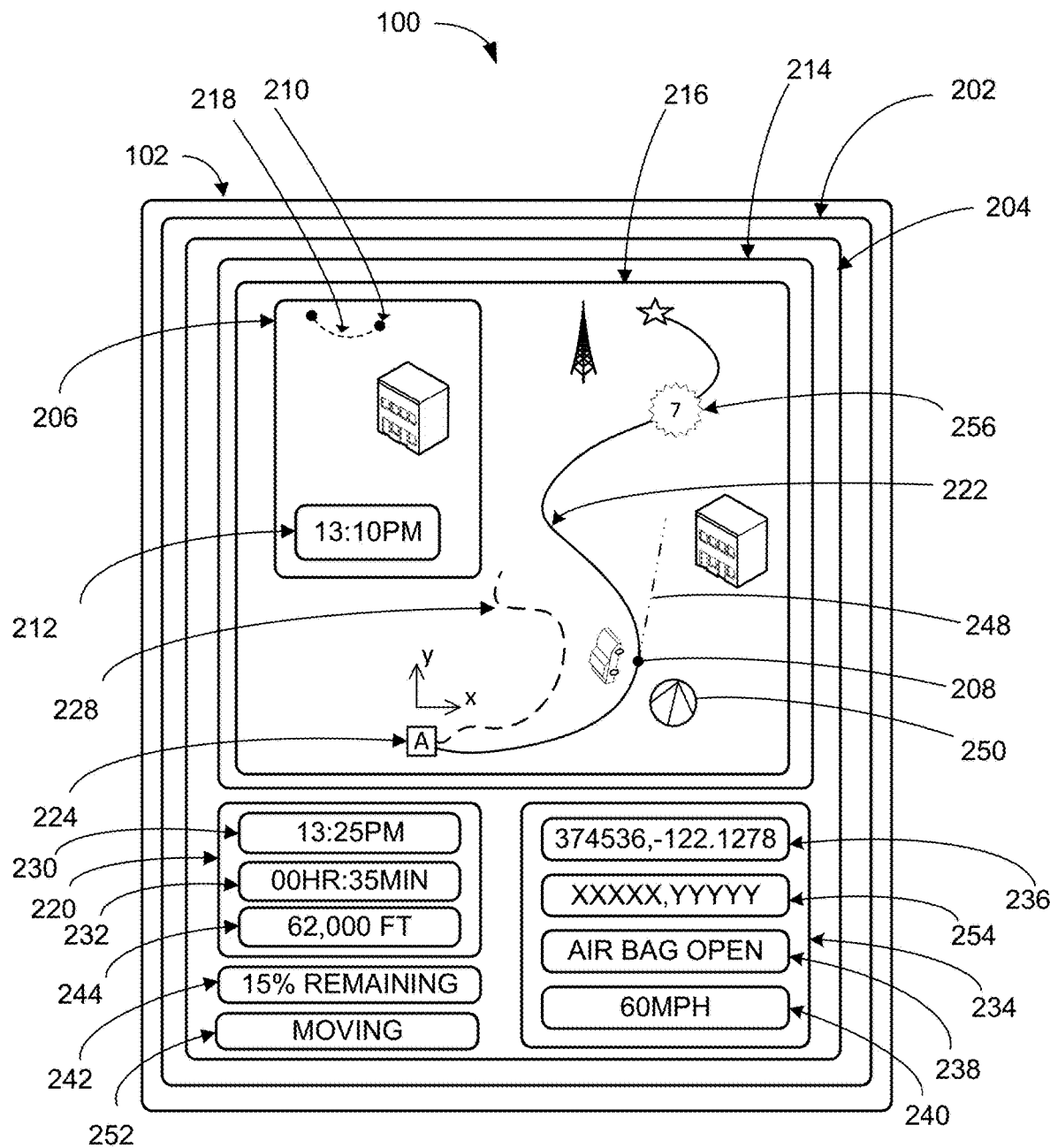
FIG. 2 is an example of a context information of the navigation system.

Referring now to FIG. 2, therein is shown an example of a context information 202 of the navigation system 100. For clarity and brevity, the various embodiments will be described with the first device 102 delivering the result generated by the navigation system 100. However, the first device 102 and the second device 106 of FIG. 1 can be discussed interchangeably.

The context information 202 is defined as an information provided by the navigation system 100. The context information 202 can be determined by the navigation system 100 for initiating a communication. For example, the context information 202 can include a navigation information 204.

The navigation information 204 is defined as information relevant to a movement of the first device 102. For example, the navigation information 204 can include a status information 206, a map information 214, a route information 220, or a combination thereof. The status information 206 is defined as information indicating a state, a condition, or a combination thereof of the first device 102. For example, the status information 206 can include a current location 208, a movement direction 250, a travel movement 252, or a combination thereof.

The current location 208 is defined as a present geographic location of the first device 102. For example, the current location 208 can represent a physical location 210 of the first device 102 at the time of the consideration by the navigation system 100.

The physical location 210 is defined as a positional information. The physical location 210 can represent the geographical position of an object, a building, or a combination thereof in the real world. For example, the physical location 210 can be represented by a geographic latitude and longitude based on a Cartesian coordinate system. In a different example, the physical location 210 can be represented by a mailing address.

A current time 212 is defined as a present moment of time. For example, the current time 212 can be based on the time zone of the geographical area occupied by the first device 102. The current time 212 can also be tracked by an atomic clock, a mechanical clock, a quartz clock, or a combination thereof.

The movement direction 250 is defined as a direction of movement from a position to another position. For example, the movement direction 250 can be represented as a cardinal direction, a points of the compass, a direction of POI, or a combination thereof.

For a specific example, the movement direction 250 can be represented as the cardinal direction including north (N), east (E), south (S), west (W), or a combination thereof. In this specific example, the movement direction 250 can also be represented in an intermediate directions including northeast (NE), southeast (SE), southwest (SW), northwest (NW), north-northeast (NNW), east-northeast (ENE), east-southeast (ESE), south-southeast (SSE), south-southwest (SSW), west-southwest (WSW), west-northwest (WNW), north-northwest (NNW), or a combination thereof.

For another specific example, the movement direction 250 can be represented as the point of compass between 0-degree and 360-degree. In this example, the 0-degree can be the direction of the Geographic North Pole (true north), the North Magnetic Pole, a predetermined direction, or a combination thereof.

In a different specific example, based on the direction of the POI, the movement direction 250 can be represented as the POI located in the direction of the movement of the first device 102. For example, the current location 208 can be the location represented in the Cartesian coordinate of 37.3357, −121.8916 on E Santa Clara Street, California. In this example, the movement of the first device 102 can be in the direction of the cardinal direction of northeast. Continuing in this example, the movement direction 250 can represent "San Jose City Hall, California" based on the San Jose City Hall also being located in the direction in the northeast direction in relation to the first device 102.

The travel movement 252 is defined as change of place or position. For example, the travel movement 252 can represent the user of the first device 102 moving from one physical location 210 to another instance of the physical location 210. For a specific example, the travel movement 252 can represent the user in the vehicle of FIG. 2 moving in the movement direction 250 representing NE. To the contrary, the travel movement 252 may not necessary exist if the vehicle is stationary with no movement.

The navigation information 204 can also include the map information 214. The map information 214 is defined as a collection of data representing the real world. The map information 214 can include the collection of data representing an arrangement or distribution of a physical feature, a non-physical feature, or a combination thereof on the map 216.

For example, the map information 214 can include a data representing the physical feature such as a path 218, a road sign, an infrastructure, a geographical feature, a natural topology, or a combination thereof. For a specific example, the map information 214 can include a physical structure used for assisting travel along the path 218. The physical structure used for traveling the path 218 can include a feature such as a traffic signal, a traffic sign, a toll booth, a freeway ramp, or a combination thereof.

In another example, the map information 214 for traveling the path 218 can include a non-physical feature such as a speed limit, a one-way driving limitation, an address of a location, or a combination thereof. For a specific example, the map information 214 can include the non-physical feature of the path 218 such as the legal speed limit, even though the road sign displaying this specific example of the map information 214 may not exist in the physical world.

The map 216 is defined as a geographic representation of the physical world. For example, the map 216 can be a representation of the physical features in a real world. For further example, the map 216 can represent a geographic location and a spatial relationship between one another. In a specific example, the map 216 can be fixed on a tangible medium such as a canvas, a paper, or a globe. In a different example, the map 216 can be in a form of a digital data for displaying on a screen. The map 216 can also represent a non-physical feature from the real world. For example, the non-physical feature such as the speed limit, an elevation contour line, name of a structure, or a combination thereof can be included in the map 216.

The path 218 is defined as a passage connecting the geographic location to another geographic location. For example, the path 218 can be a road for navigation connecting the physical location 210 to another instance of the physical location 210. For a specific example, the path 218 can represent the road section of the San Francisco-Oakland Bay Bridge connecting the city of San Francisco, Calif. (Calif.), United States of America (USA) and the city of Oakland, Calif., USA. In this specific example, the path 218 can be the road section of the bridge between the physical location 210 at 37.789, −122.388 and the 37.823, −122.322 represented in the Cartesian coordinate.

The route information 220 is defined as information for traveling a route. For example, the route information 220 can include information for traveling the route including a drive route 222, a start point 224, a destination point 226, a past route 228, a departure time 230, or a combination thereof.

The drive route 222 is defined as the path 218 taken by a user of the first device 102 for travel. For example, the drive route 222 can be the path 218 connecting the physical location 210 to another instance of the physical location 210 for the user of the first device 102 to travel. For a specific example, the user of the first device 102 can travel the path 218 between the start point 224 and the destination point 226 of the drive route 222.

The start point 224 is defined as a beginning of a user's travel route. For example, the start point 224 can be the physical location 210 representing the beginning of the drive route 222. In a different example, if the start point 224 is not provided, the current location 208 can replace the start point 224. The start point 224 is not limited to the beginning of the current instance of the drive route 222, the current location 208, or a combination thereof. For example, the start point 224 can also represent a beginning of the past route 228.

The destination point 226 is defined as the end of the user's travel route. For example, the drive route 222 can include the physical location 210 at the end of the drive route 222, the past route 228, or a combination thereof representing the destination point 226. In another example, when a new instance of the destination point 226 is determined by the navigation system 100, the previously determined instance of the destination point 226 can be cancelled, converted to a way point, or a combination thereof.

The past route 228 is defined as the path 218 previously traveled. For example, the past route 228 can represent the drive route 222 previously traveled by the user. In a different example, the past route 228 can represent the path 218 other than the drive route 222 previously traveled by the user, other drivers, or a combination thereof.

The past route 228 can include the departure time 230. The departure time 230 is defined as a temporal beginning of travel. For example, the departure time 230 can represent the moment the user of the first device 102 begins travel. In another example, the departure time 230 can represent the moment the user of the first device 102 began travel in the past route 228 previously. In a different example, the departure time 230 can represent the time scheduled for the user of the first device 102 to begin traveling in the future.

The route information 220 can also include a remaining distance 244, a driving time 232, an arrival time 246, a speed limit or a combination thereof. The remaining distance 244 is defined as the distance between the current location 208 and the physical location 210 headed to by the user. For example, the remaining distance 244 can represent the distance between the current location 208 and the destination point 226. More specifically, in this example, the remaining distance 244 can be the distance between the current location 208 and the destination point 226 along the drive route 222, the rectilinear distance between the current location 208 and the destination point 226, or a combination thereof. For a specific example the current location 208 can be located at the physical location 210 in a Cartesian coordinate system of x=5, y=10 and the destination point 226 can be located at x=15, y=10. In this specific example, the remaining distance 244 can be 10.

In another example, the remaining distance 244 can represent the distance between the current location 208 and an upcoming turn, a POI, or a combination thereof headed by the user of the first device 102. For a specific example, if the distance between the current location 208 and the upcoming turn is 10 meters, the remaining distance 244 can be 10 meters. In another specific example, if the distance between the current location 208 and the POI headed to by the user is 20 meters, the remaining distance 244 can be 20 meters.

The driving time 232 is defined as the duration of travel. For example, the driving time 232 can represent the duration of travel from one instance of the physical location 210 to another instance of the physical location 210. In another example, the driving time 232 can represent the duration calculated for the user of the first device 102 to travel from the current location 208, the start point 224, or a combination thereof to the destination point 226.

The arrival time 246 is defined as the time of the user arriving at the destination. For example, the arrival time 246 can represent the pre-determined instance of the time for the user to arrive at a destination point 226. In another example, the arrival time 246 can represent the instance of time the user is calculated to arrive at the destination point 226 based on other factors.

The route information 220 can further include a projected route 248, a missing destination 254, or a combination thereof. The projected route 248 is defined as an anticipated instance of the path 218 likely to be traveled by the user. The projected route 248 can be based on the current location 208, the drive route 222, the movement direction 250, the map 216, the past route 228, or a combination thereof.

For example, the projected route 248 can be based on the current location 208, the movement direction 250, the map 216, or a combination thereof. In this example, the projected route 248 can be the path 218 in the direction of the movement direction 250 from the current location 208. For a specific example, the current location 208 can be located at the physical location 210 representing location A and the movement direction 250 can be east. In this specific example, the path 218 from the current location 208 to the eastern direction in the direction of the movement direction 250 along the map 216 can be the projected route 248.

For a different example, the projected route 248 can be based on the drive route 222. In this example, the path 218 between the current location 208 and the destination point 226 along the drive route 222 can be the projected route 248.

In another example, the projected route 248 can be based on the current location 208, the past route 228, or a combination thereof. In this example, the path 218 between the current location 208 and the destination point 226 along the past route 228 can be the projected route 248.

The missing destination 254 is defined as the status of missing a destination for travel. For example, the missing destination 254 can be the status of the navigation system 100 without an instance of the physical location 210 designated as the destination point 226.

The navigation information 204 can also include an updating information 234. The updating information 234 is defined as dynamically updating information representing an event, a condition, or a combination thereof. The updating information 234 can include a construction location 236, an emergency information 238, a traffic speed 240, a fuel remainder 242 or a combination thereof.

The construction location 236 is defined as the location of a construction site. The construction location 236 can represent the physical location 210 of various types of construction sites including a road paving, a traffic signal installation, a building construction, or a combination thereof. For example, the construction location 236 can be represented by a mailing address, a Cartesian coordinate system, or a combination thereof.

The emergency information 238 is defined as information of an emergency incident. For example, the emergency information 238 can include the physical location 210 of the emergency incident, the type of the emergency incident, or a combination thereof. In these examples, the type of the incident in the emergency information 238 can include an air bags deploying, a flat tire, a stalled vehicle, an object on the road, or a combination thereof.

The traffic speed 240 is defined as a speed of a vehicle on a roadway. For example, the traffic speed 240 can be the average speed of the vehicles traveling the drive route 222, the path 218 ahead of the user of the first device 102, or a combination thereof.

The traffic speed 240 can be represented in various ways. For example, the traffic speed 240 can be represented in an alphanumeric value of 0 through 9, A through Z, or a combination thereof. For a specific example, "15 MPH (miles per hour)" can represent the traffic speed 240 of 15 miles per hour by the vehicles currently traveling on the roadway.

In a different example, the traffic speed 240 can be represented as a quality attribute experienced by the user of the first device 102. In this example, the traffic speed 240 can be represented by the quality attribute of FAST if the traffic speed 240 can be perceived by the user as traveling too fast. In another example, the traffic speed 240 can be represented by the quality attribute of SLOW if the traffic speed 240 can be perceived by the user as traveling too slow.

The fuel remainder 242 is defined as an amount of fuel remaining in the fuel tank. For example, the fuel remainder 242 can represent the amount of fuel remaining relative to a vehicle's fuel tank capacity, an absolute amount of fuel remaining in the fuel tank, or a combination thereof. For a specific example, 25% can represent the fuel remainder 242 where a quarter tank of fuel is remaining in the fuel tank. In another specific example, 5 gal. can represent the fuel remainder 242 where five gallons of fuel remains in the fuel tank.

The updating information 234 can also include an accident vehicle number 256. The accident vehicle number 256 is defined as the number of vehicle in an accident. For example, the accident vehicle number 256 can be the number of vehicle physically colliding in an accident. In another example, the accident vehicle number 256 can be a number of vehicles stopped at an accident location. For a specific example, 5 vehicles can collide in an accident and 2 emergency vehicles can arrive at that accident location. In this specific example, the accident vehicle number 256 can be 5 based on the number of vehicles colliding in the accident. Alternatively, in the same specific example, the accident vehicle number 256 can be 7 based on the number of vehicles stopped at the accident location including the 5 vehicles collided and the 2 emergency vehicles arriving to the accident scene.

Figure 3:
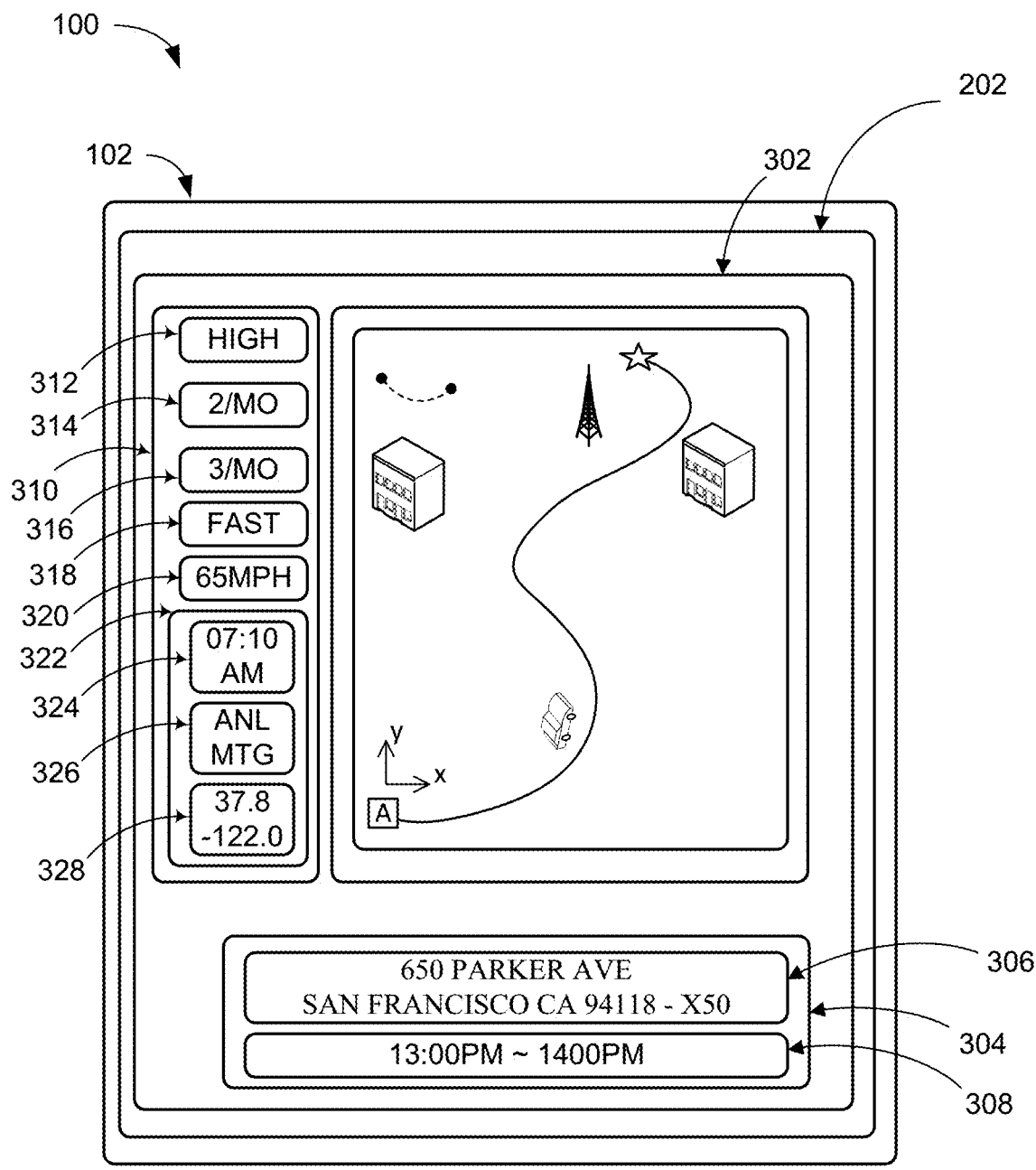
FIG. 3 is an example of a user information of the navigation system.

Referring now to FIG. 3, therein is shown an example of a user information 302 of the navigation system 100. The user information 302 is defined as information of the user of the navigation system 100. The user information 302 can include various information of the user.

For example, the user information 302 can include the user's preference in hobby, food, retail establishment for shopping, a driving condition, or a combination thereof. In a different example, the user information 302 can include a personal information of the user such as a user's home address, an address stored in an address book, the user's bank information, the user's school information, the user's workplace information, or a combination thereof. In another example, the user information 302 can include the driving record of the user. For a specific example, the user information 302 can include a user navigation history 304, a user provided information 310, or a combination thereof.

The user navigation history 304 is defined as a travel record of the user. The user navigation history 304 can include the time and the location of a place previously visited by the user. For example, the user navigation history 304 can include a past trip 306, a past dining time 308, or a combination thereof.

The past trip 306 is defined as a trip previously traveled by the user. For example, the past trip 306 can include the physical location 210 of FIG. 2 of the place previously visited by the user, the time and date previously visited by the user, or a combination thereof. In these examples, the place previously visited by the user can include a food providing establishment, a school, a work place, the user's home, other private or public establishment, or a combination thereof.

For a specific example, the past trip 306 can include the physical location 210 of the 100 First Plaza Building represented by the mailing address of "100 First Street, San Francisco, Calif." In this specific example, the past trip 306 can also be represented using the Cartesian coordinate of "37.7891°, −122.3975°." In this example, the past trip 306 to the First Plaza Building can also include "08:00 AM Aug. 15, 2014," "08:02 AM Aug. 16, 2014," "07:58 AM Aug. 16, 2014" representing the time and the date the user previously visited the 100 First Plaza Building.

The past dining time 308 is defined as a time the user previously dined. For example, the past dining time 308 can represent the time the user began traveling to a food providing establishment such as a café, a restaurant, a bar, a grocery store, a deli, or a combination thereof. In another example, the past dining time 308 can represent the time the user arrived at the food providing establishment.

In a further example, the past dining time 308 can be a specific instance of time, a range of time, or a combination thereof of the user dining in the past. For a specific example, "13:00~14:00" can represent the past dining time 308 where the user was dining at the food providing establishment from 13:00 to 14:00 in the afternoon.

The user provided information 310 is defined as an information from the user. For example, the user provided information 310 can include an accident avoidance preference 312, a speed preference 318, or a combination thereof.

The accident avoidance preference 312 is defined as an inclination of the user to be notified of the accident along the path 218 of FIG. 2 of travel. The accident avoidance preference 312 can represent the inclination of the user to be notified of the accident in various ways. For example, the accident avoidance preference 312 can be represented in an alphanumeric value of A to Z, 0 to 9, or a combination thereof. For a specific example, the accident avoidance preference 312 of HIGH can represent the inclination of the user to be notified of any accident occurring along the drive route 222 of FIG. 2, the path 218 of travel, or a combination thereof.

In a different specific example, the accident avoidance preference 312 of LOW can represent the inclination of the user to be notified when driving by an accident site involving large number of vehicles. More specifically, the accident avoidance preference 312 of LOW can represent the user's inclination to be notified when driving by the accident site involving number of vehicles equal to or greater than an accident number threshold 314. Continuing with the example, if the number of vehicles involved in the accident is below the accident number threshold 314, the user with the accident avoidance preference 312 representing LOW will not be notified of an accident on the path 218.

The accident number threshold 314 is defined as a metric used for comparison for notifying the user of an accident. For example, the accident number threshold 314 can be compared to the number of vehicles involved in an accident. The accident number threshold 314 can be represented in an alphanumeric combination of A to Z, 0 to 9, or a combination thereof. For a specific example, "3 VEHICLES" can represent the accident number threshold 314 representing three vehicles.

In another example, the accident avoidance preference 312 can represent the inclination of the user to be notified based on the likelihood of accidents occurring along the path 218 for the user to travel. For example, if the accident avoidance preference 312 is LOW, the user can be notified when the rate of the accident occurring on the path 218 for user to travel is greater than an accident likelihood threshold 316.

The accident likelihood threshold 316 is defined as a metric used for comparison to notify the user the likelihood of accident occurring along the path 218 of travel. The accident likelihood threshold 316 can be represented in various ways including degree of intensity, classification, arrangement, or a combination thereof.

For example, the accident likelihood threshold 316 can be represented as a rate of accident in an alphanumeric combination of A to Z, 0 to 9, or a combination thereof. For a specific example, HIGH, LOW, or a combination thereof can represent the likelihood of accident occurring along the path 218 of travel represented by degree of intensity. In this specific example, the user can be notified of the likelihood of accident occurring if the accident avoidance preference 312 is HIGH and the path 218 determined for the user to travel has any rate of accident occurring. In a different specific example, if the accident avoidance preference 312 is LOW and the rate of accidents occurring along the path 218 is greater than the accident likelihood threshold 316, the navigation system 100 can notify the user of the likelihood of accident occurring.

Alternatively, in another example, if the accident avoidance preference 312 is LOW and the rate of accident occurring along the path 218 is less than the accidents likelihood threshold 316, the navigation system 100 would not notify the user of the likelihood of accident occurring. The accident avoidance preference 312 is not limited to HIGH and LOW as used in the example above. For example, the accident avoidance preference 312 can be divided into multiple levels, each representing a varying range of likelihood of accident occurring.

For a specific example, the accident avoidance preference 312 can be divided into HIGH, MID, LOW, or a combination thereof. In this specific example, the accident avoidance preference 312 of HIGH can represent the user's preference to be notified when the path 218 has any rate of accident occurring. Continuing in this specific example, the accident avoidance preference 312 of MID can represent the user's preference to be notified if the path 218 has rate of 5 or more accidents occurring per year. Continuing further in this specific example, the accident avoidance preference 312 of LOW can represent the user's preference to be notified if the path 218 has rate of 10 or more accident occurring per year.

The speed preference 318 is defined as an inclination of the user to receive a notification of the traffic speed 240 of FIG. 2. The inclination of the user to receive the notification of the traffic speed 240 can be represented in various ways. For example, the inclination of the user to be notified of the traffic speed 240 can be represented as degree of intensity, classification, arrangement, or a combination thereof. For a specific example, FAST, SLOW, or a combination thereof can represent the inclination of the user to be notified of the traffic speed 240 in degree of intensity of speed along the drive route 222, the path 218 of travel, or a combination thereof.

For example, the speed preference 318 of FAST can represent the inclination of the user to be notified when the traffic speed 240 is slow. More specifically, in this specific example, the navigation system 100 can notify the slow moving traffic to the user based on the traffic speed 240 along the path 218 of travel, the drive route 222, or a combination thereof moving slower than a traffic speed threshold 320.

For a different specific example, the speed preference 318 of SLOW can represent the inclination of the user to be notified when the traffic speed 240 is fast. More specifically, in this specific example, the navigation system 100 can notify the fast moving traffic to the user based on the traffic speed 240 for the path 218 of travel, the drive route 222, or a combination thereof moving faster than the traffic speed threshold 320.

The traffic speed threshold 320 is defined as a metric used for comparison with the traffic speed 240 to notify the user of the speed of the traffic. For example, the traffic speed threshold 320 can be represented in an alphanumeric value of A to Z, 0 to 9, or a combination thereof. The traffic speed threshold 320 can be set at various values. For a specific example, the "60 KM" can represent the traffic speed threshold 320 set to notify the traffic speed 240 to the user when the traffic speed 240 is less than 60 (km/hr.) kilometers/hour, equal to or greater than 60 (km/hr), or a combination thereof. For a different specific example, the "100 KM" can represent the traffic speed threshold 320 of 100 km/hr. The traffic speed threshold 320 is not limited to 60 km/hr and 100 km/hr as used in the example and can be any value, for example, determined by the navigation system 100.

The fast speed threshold 334 is defined as a metric used for comparison to determine the vehicle traveling "Fast." For example, the fast speed threshold 334 can be represented in an alphanumeric value of A to Z, 0 to 9, or a combination thereof. For a specific example, "55 MPH" can represent the fast speed threshold 334 of 55 miles per hour.

The slow speed threshold 336 is defined as a metric used for comparison to determine the vehicle traveling "Slow." For example, the slow speed threshold 336 can be represented in an alphanumeric value of A to Z, 0 to 9, or a combination thereof. For a specific example, "15 MPH" can represent the slow speed threshold 336 of 15 miles per hour. The fast speed threshold 334 and the slow speed threshold 336 are not limited to the threshold value of 55 MPH, 15 MPH and can be tailored to other values according to the user's needs.

In another example, the user provided information 310 can also include an event schedule 322. The event schedule 322 is defined as a pre-determined arrangement. The event schedule 322 can include various types of pre-determined arrangement. For example, the event schedule 322 can include various information of the pre-determined arrangement including an event location 328, an event time 324, an event name 326, or a combination thereof.

The event location 328 is defined as the geographic location of the pre-determined arrangement. The event location 328 can be presented in the Cartesian coordinate system, the mailing address, or a combination thereof. For examples, the alphanumeric value of A to Z, 0 to 9, or a combination thereof can represent the event location 328. For a specific example, "1 Ferry Bldg. Marketplace, San Francisco, Calif. 94111" can represent the mailing address of the Ferry Building Marketplace in San Francisco, Calif. In this specific example, the event location 328 can also be represented in the Cartesian coordinate of "37.79513, −122.39300."

The event time 324 is defined as a temporal information of the pre-determined arrangement. The event time 324 can represent the temporal information of the pre-determined arrangement in various ways. For example, the event time 324 can be represented as an instance of time, a span of time, or a combination thereof. In this example, the alphanumeric value of A through Z, 0 through 9, or a combination thereof can represent the event time 324.

For a specific example, "2012 Nov. 27 0900 PST" can represent the event time 324 as an instance of time for Nov. 27, 2012 at 9 AM Pacific Standard Time (PST). In a different specific example, "2012 Nov. 27 0900 PST-2012 Nov. 27 1300 PST" can represent the event time 324 for the span of time between 9 AM PST and 1 PM PST on Nov. 27, 2012.

The event name 326 is defined as a title of the pre-determined arrangement. The event name 326 can be represented in various ways. For example, the event name 326 can be represented in the alphanumeric value of A to Z, 0 to 9, or a combination thereof. For a specific example, the "ABC Company—Annual Shareholder Meeting" can represent the event name 326 of the annual shareholder meeting for the ABC Company.

Figure 4:
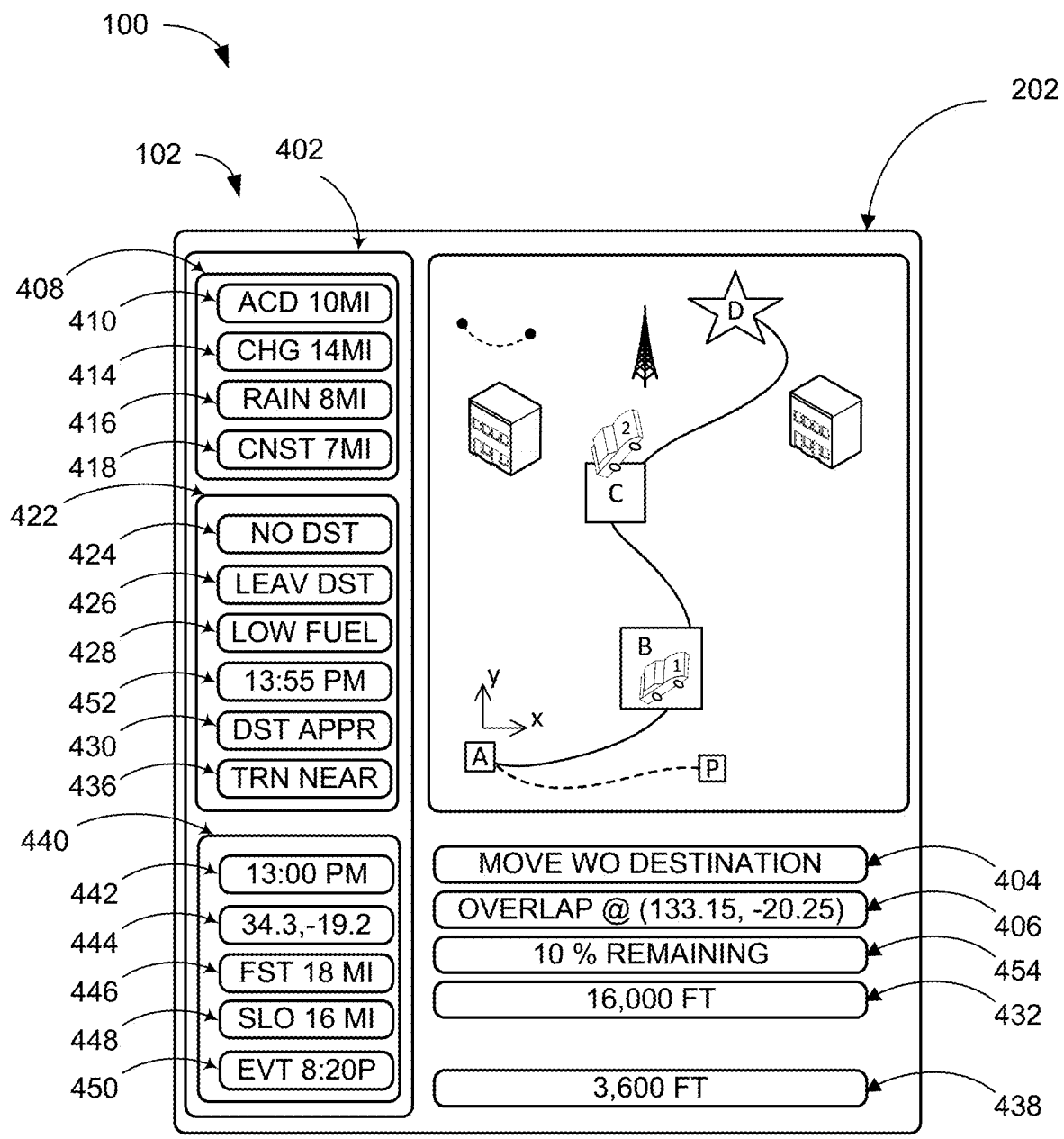
FIG. 4 is an example of a trigger event of the navigation system.

Referring now to FIG. 4, therein is shown an example of a trigger event 402 of the navigation system 100. The trigger event 402 is defined as an indication to generate a message. For example, the trigger event 402 can indicate the navigation system 100 to generate the message based on the context information 202 of FIG. 2 meeting a cue condition 404.

A location overlap 406 is defined as multiple objects occupying a common location. For example, the objects physically occupying the common location can be a structure, a chattel, a person, an article, or a combination thereof. In this example, the location overlap 406 can be a condition of the object occupying the common location wholly or in part.

For a specific example, the vehicle 1 of FIG. 4 and the location denoted B of FIG. 4 can represent the location overlap 406 where the entire vehicle is within the geographic area B. In another specific example, the vehicle 2 of FIG. 4 and the geographic area denoted C of FIG. 4 can represent the condition of the location overlap 406 where part of the vehicle 2 is located inside location C.

A time overlap 452 is defined as condition of a time period overlapping another time period. The time period can represent an instance of time, a span of time, or a combination thereof. For example, the time period can overlap another time period in its entirety or in part. For a specific example, the time period A can represent the instance of time at 14:00 and the time period B can represent the span of time from 13:00 to 15:00. In this specific example, the entirety of the time period A can be within the time period B to represent the time overlap 452. In another specific example, the time period A can alternatively represent the span of time from 12:30 PM to 13:30. This specific example can represent the time overlap 452 in part since the time period A and the time period B occupies the common span of time between 13:00 and 13:30.

The cue condition 404 is defined as a requirement for detecting the trigger event 402. For example, the context information 202 meeting the cue condition 404 can represent the detection of the trigger event 402. The trigger event 402 can include a network sourced trigger 408.

The network sourced trigger 408 is defined as the trigger event 402 based on communicated information. For example, the network sourced trigger 408 can be the trigger event 402 based on the context information 202 meeting the cue condition 404 representing an emergency situation 410, a traffic speed change 414, a weather condition 416, a construction condition 418, or a combination thereof.

The emergency situation 410 is defined as an unexpected incident that calls for immediate action. The emergency situation 410 can include various types of unexpected incident. For example, the unexpected incident can include a vehicle getting into an accident, a vehicle getting a flat tire, or a combination thereof. In this example, the accident can represent an incident such as a vehicle deploying an airbag, experiencing a sudden impact, or a combination thereof.

The traffic speed change 414 is defined as a transition in the speed of the traffic. The traffic speed change 414 can represent the speed of the traffic transitioning in various ways. For example, the traffic speed change 414 can represent the traffic speed 240 of FIG. 2 decelerating or accelerating along the drive route 222 of FIG. 2, the path 218 of FIG. 2, or a combination thereof.

For a specific example, the traffic speed change 414 can represent the traffic speed 240 suddenly decelerating from "fast" to "slow." In these specific examples, the decrease in the traffic speed 240 can be a result of the traffic speed 240 reducing due to a traffic jam, a traffic accident, a roadway construction, or a combination thereof along the drive route 222, the path 218 of the first device 102, or a combination thereof.

In another specific example, the traffic speed change 414 can represent the traffic speed 240 suddenly accelerating from "slow" to "fast." In this specific example, the speed of the traffic increasing can be a result of the traffic jam clearing, the traffic accident clearing, the end of the construction zone approaching, or a combination thereof along the drive route 222, the path 218 ahead of the user of the first device 102, or a combination thereof. In these specific examples, the traffic speed 240 can be considered fast if the traffic speed 240 is faster than a fast speed threshold 334 of FIG. 3. In addition, the traffic speed 240 can be considered slow if the traffic speed 240 is slower than a slow speed threshold 336 of FIG. 3.

The weather condition 416 is defined as a physical phenomenon of the atmosphere. For example, the weather condition 416 can represent various types of physical phenomenon of the atmosphere. For a specific example, the weather condition 416 can represent the physical phenomenon including rain, fog, snow, flood, storm, clear sky, or a combination thereof. The weather condition 416 can represent the physical phenomenon occurring along the drive route 222, the path 218 of travel, or a combination thereof. For a specific example, the weather condition 416 can also represent the physical phenomenon caused by the ocean or other body of water, such as high tide or a river at flood stage causing the path 218 to submerge.

The construction condition 418 is defined as a construction along the path 218. For example, the construction condition 418 can represent the construction location 236 of FIG. 2 between the current location 208 of FIG. 2 and the destination point 226 of FIG. 2 along the drive route 222. In a different example, the construction condition 418 can represent the construction location 236 ahead along the path 218 driven by the user of the first device 102.

In another example, the trigger event 402 can include a movement trigger 422. The movement trigger 422 is defined as the trigger event 402 based on a movement of the user. For example, the movement trigger 422 can be the trigger event 402 based on the movement of the user of the first device 102 meeting the cue condition 404 representing a free movement 424, a leaving destination 426, a low fuel 428, or a combination thereof.

The free movement 424 is defined as the movement of the user of the first device 102 without designating a destination. For example, the free movement 424 can represent the user of the first device 102 navigating without designating the destination point 226.

The leaving destination 426 is defined as a user of the first device 102 traveling away from the destination point 226. For example, the leaving destination 426 can represent the user of the first device 102 arriving at the destination point 226 and thereafter traveling away from the destination point 226. For a specific example, geographic location A of FIG. 4 can represent the start point 224 of FIG. 2 and the geographic location D of FIG. 4 can represent the destination point 226. In this specific example, the user of the first device 102 can first travel from the location A to the location D. Continuing in this specific example, the leaving destination 426 can represent the user of the first device 102 thereafter moving away from the location D.

The low fuel 428 is defined as an amount of fuel remaining considered low. For example, the low fuel 428 can represent the status of the amount of fuel remaining that is considered low in the fuel reservoir of the vehicle. More specifically, the low fuel 428 can be the cue condition 404 representing the fuel remainder 242 of FIG. 2 below a fuel level threshold 454. In this specific example, the fuel reservoir can represent a container for containing fossil fuel representing gasoline, diesel, natural gas, propane, coal or combination thereof. In a further specific example, the fuel reservoir can represent the container for containing alternative fuel such as bio-diesel, bio-alcohol, refuse-derived fuel, hydrogen, and other biomass sources. In another specific example, the fuel reservoir can represent a battery containing electric power. In these specific examples, the fuel reservoir can be but is not limited to a physical device in or on the vehicle. For example, fuel reservoir of the vehicle running on a vehicle-to-grid (V2G) system can represent the amount of fuel remaining in the V2G system. In this example, the V2G system can represent a system in which the fuel, for example, an electric energy, is transferred to the vehicle from the power distribution network.

The fuel level threshold 454 is defined as a metric used for comparison to determine the vehicle's fuel level. For example, the fuel level threshold 454 can be represented by an alphanumeric value of A to Z, 0 to 9, or a combination thereof. For a specific example, "5 L (liter)" can represent the fuel level threshold 454 of 5 liters. In this example, the amount of fuel remaining in the vehicle with the first device 102 can be considered low if the fuel remainder 242 is less than 5 liters.

In another example, the fuel level threshold 454 can be represented as a percentage of fuel remaining. For a specific example, "10%" can represent the fuel level threshold 454 of ten percent of the fuel tank capacity. In this example, the low fuel 428 can represent the amount of fuel remaining where the fuel remainder 242 is less than 10% of the fuel tank capacity.

In another example, the movement trigger 422 can also be the trigger event 402 based on the movement of the user of the first device 102 meeting the cue condition 404 representing a destination approaching 430, a turn nearby 436, or a combination thereof. The destination approaching 430 is defined as the nearing of the destination. For example, the destination approaching 430 can represent the physical location 210 of the first device 102 nearing the destination point 226. In this example, the destination approaching 430 can represent the user of the first device 102 approaching the destination point 226 based on comparing a remaining distance 244 of FIG. 2 and a destination proximity threshold 432.

The destination proximity threshold 432 is defined as a metric used for comparison to determine the user of the first device 102 approaching the destination point 226. For example, the destination proximity threshold 432 can be a distance represented by an alphanumeric value of A to Z, 0 to 9, or a combination thereof.

For a specific example, "500 M (meter)" can represent the destination proximity threshold 432 of 500 meters. In this specific example, the destination proximity threshold 432 can be 500 meters and the remaining distance 244 can be 800 meters. As the user of the first device 102 approaches the destination point 226, the remaining distance 244 can decrease in value. Continuing in this specific example, the cue condition 404 representing the destination approaching 430 can be satisfied when the remaining distance 244 decreases to a distance of 500 meters or less.

The turn nearby 436 is defined as an approaching of a turn. For example, the turn nearby 436 can be the cue condition 404 representing the user of the first device 102 approaching the turn along the drive route 222. In this example, the cue condition 404 representing the turn nearby 436 can be determined by comparing a turn distance threshold 438 and the remaining distance 244 from the current location 208 to the approaching turn along the drive route 222. More specifically, the turn nearby 436 can be determined based on the distance between the current location 208 and the approaching turn decreasing to a distance less than the turn distance threshold 438.

For a specific example, the turn distance threshold 438 can be 3 KM (kilometer) and the remaining distance 244 from the current location 208 to the approaching turn can be 5 KM. In this specific example, the distance from the current location 208 to the approaching turn can decrease as the first device 102 navigates the drive route 222 towards the destination point 226. Based on the distance from the current location 208 to the approaching turn decreasing to 3 KM or less, the turn nearby 436 can be determined.

The turn distance threshold 438 is defined as a metric used for comparison to determine the cue condition 404 representing the turn nearby 436. For example, the turn distance threshold 438 can be represented in an alphanumeric value of A to Z, 0 to 9, or a combination thereof. For a specific example, the turn distance threshold 438 of "3 KM" can represent the distance of 3 kilometers.

The trigger event 402 can also include a user specific trigger 440. The user specific trigger 440 is defined as an indication to generate a message based on the information tailored to the user. For example, the user specific trigger 440 can be the trigger event 402 based on the context information 202 meeting the cue condition 404 representing a predicted destination 444, a predicted dining time 442, or a combination thereof.

The predicted destination 444 is defined as a location predicted as the destination of the user. For example, the predicted destination 444 can be the physical location 210 forecasted as the destination point 226 of the user of the first device 102 based on the past trip 306 of FIG. 3. In this example, the predicted destination 444 can be a food providing establishment, user's school, user's work place, user's home, friend's house, other commercial and public establishment, address stored in the address book, or a combination thereof previously visited by the user of the first device 102.

For example, the predicted destination 444 can be the physical location 210 most often traveled to by the user of the first device 102 from the current location 208 under similar conditions from the past trip 306 traveled. In this example, the place most often traveled to by the user under a similar condition can be determined by machine learning or using an algorithm such as Cosine similarity considering various factors such as day of the week, time of the day, the current location 208 the start point 224, or a combination thereof.

For a specific example, the current location 208 can be the user's home and the current time 212 FIG. 2 can be 8 AM. Continuing in this specific example, if the location most often traveled from the user's home around 8 AM is the user's work place located at the "First Plaza Building," the First Plaza Building can be determined as the predicted destination 444.

The predicted dining time 442 is defined as a forecasted user's dining time. For example, the dining time can be the instance of time when the user begins to travel to a food providing establishment. In another example, the dining time can be the instance of time when the user arrives at the food providing establishment.

The predicted dining time 442 can be based on the frequency of the user traveling to the food providing establishment in the multiple instances of the past dining time 308 of FIG. 3. For example, "13:00" can be the predicted dining time 442 based on the user previously traveling to the food providing establishment, the user arriving at the food providing establishment, or a combination thereof at 13:00.

The trigger event 402 can further include the user specific trigger 440 based on the context information 202 meeting the cue condition 404 representing a dangerous road ahead 446, an undesired speed ahead 448, an event approaching 450, or a combination thereof. The dangerous road ahead 446 is defined as a dangerous situation approaching on the path 218. For example, the dangerous situation can be an automobile accident along the projected route 248.

For a specific example, the cue condition 404 representing the dangerous road ahead 446 can be based on the presence of an accident along the projected route 248 and the accident avoidance preference 312 of FIG. 3 of HIGH. For a different specific example, the cue condition 404 representing the dangerous road ahead 446 can be determined based on the accident avoidance preference 312 of LOW and the presence of an accident along the path 218 of travel involving number of vehicles greater than the accident number threshold 314 of FIG. 3.

The undesired speed ahead 448 is defined as a traffic moving at an undesirable speed for the user. For example, the speed undesirable for the user can represent the traffic speed 240 too fast for the driver, too slow for the driver, or a combination thereof. For a specific example, the cue condition 404 representing the undesired speed ahead 448 can be based on the speed preference 318 of FIG. 3 of FAST and the traffic speed 240 slower than the traffic speed threshold 320 of FIG. 3. In another specific example, the cue condition 404 representing the undesired speed ahead 448 can be based on the speed preference 318 of SLOW and the traffic speed 240 meeting or exceeding the traffic speed threshold 320.

The event approaching 450 is defined as the time to begin traveling to an event. For example, the event approaching 450 can be based on the current time 212 meeting or passing the departure time 230. For a specific example, the current time 212 can be 14:00 and the departure time 230 can be 14:15. In this specific example, the event approaching 450 can be determined based on the current time 212 reaching the departure time 230 of 14:15 PM.

Figure 5:
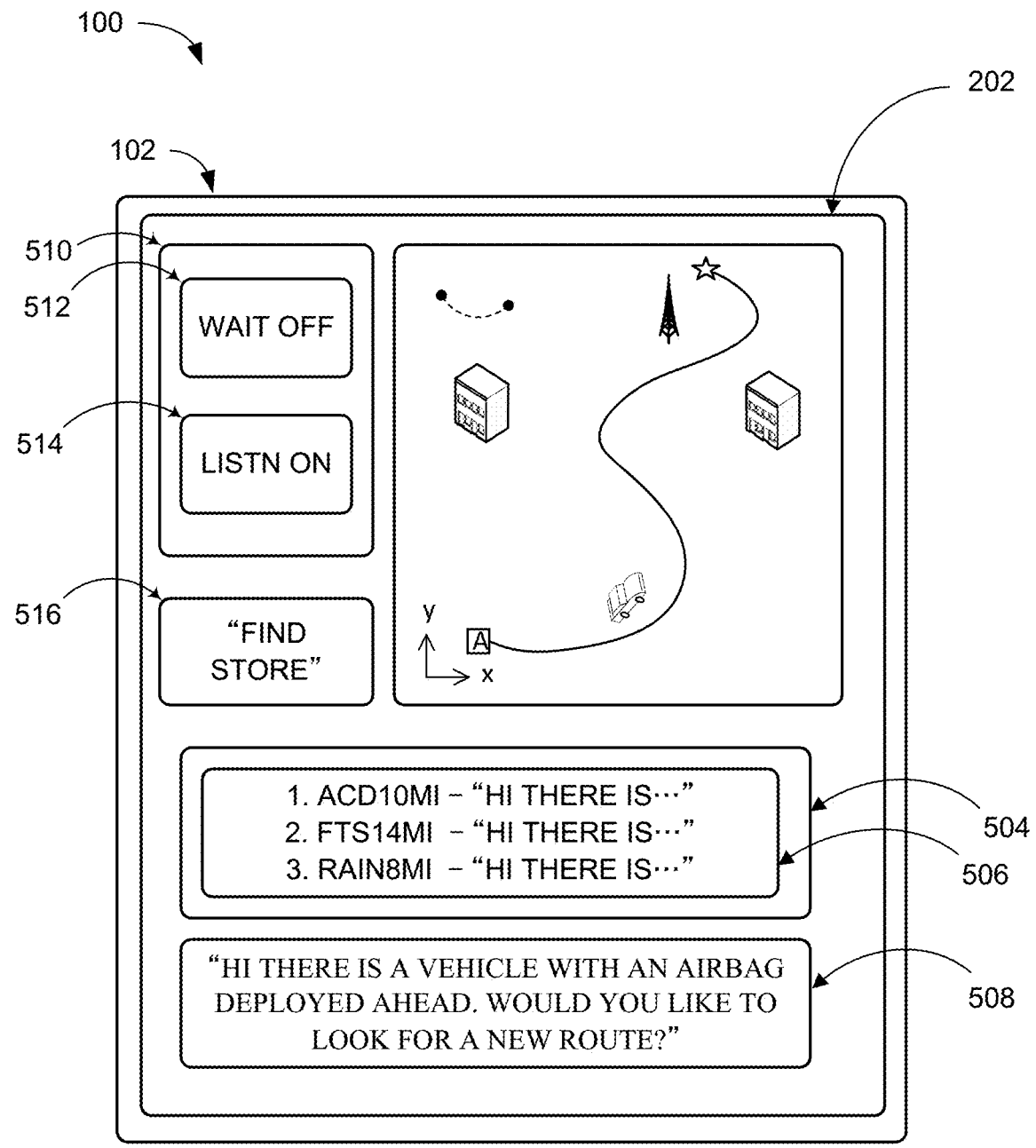
FIG. 5 is an example of a system initiated inquiry of the navigation system.

Referring now to FIG. 5, therein is shown an example of a system initiated inquiry 508. The system initiated inquiry 508 is defined as a message generated by the navigation system 100. The system initiated inquiry 508 can represent the message based on the user's behavior, a preference, a schedule, an external information, a template, or a combination thereof for communicating with the user. For example, the system initiated inquiry 508 can be the message based on the trigger event 402 of FIG. 4, the cue condition 404 of FIG. 4 satisfied for detecting the trigger event 402, an initiating question database 504, or a combination thereof.

The initiating question database 504 is defined as a collection of messages. For example, the initiating question database 504 can represent a collection of a message template 506. The message template 506 can be linked to the trigger event 402, the cue condition 404 of FIG. 4, or a combination thereof. For example, the message template 506 in the initiating question database 504 can be linked to the cue condition 404 satisfied for detecting the trigger event 402 representing the network sourced trigger 408 of FIG. 4, the movement trigger 422 of FIG. 4, the user specific trigger 440 of FIG. 4, or a combination thereof.

The message template 506 is defined as a message in a prescribed form. For example, the message template 506 can be used for generating the system initiated inquiry 508. The message template 506 can be represented in an alphanumeric value of 0 through 9, A through Z, or a combination thereof.

For a specific example, the message template 506 can be linked to the cue condition 404 representing the emergency situation 410 of FIG. 4 for detecting the network sourced trigger 408. In this specific example, the emergency situation 410 can be based on a vehicle getting into an accident, a vehicle getting a flat tire, or a combination thereof. For a different specific example, the message template 506 can be linked to the cue condition 404 representing the traffic speed change 414 of FIG. 4, the weather condition 416 of FIG. 4, the construction condition 418 of FIG. 4, or a combination thereof for detecting the network sourced trigger 408.

In another specific example, the message template 506 can be linked to the cue condition 404 representing the free movement 424 of FIG. 4, the leaving destination 426 of FIG. 4, the low fuel 428 of FIG. 4, the destination approaching 430 of FIG. 4, the turn nearby 436 of FIG. 4, or a combination thereof for detecting the movement trigger 422. In a further specific example, the message template 506 can be linked to the cue condition 404 representing the predicted dining time 442 of FIG. 4, the predicted destination 444 of FIG. 4, the dangerous road ahead 446, the undesired speed ahead 448, the event approaching 450, or a combination thereof for detecting the user specific trigger 440.

For a specific example, the message template 506 linked to the cue condition 404 representing the emergency situation 410 based on the air bag deploying can present "There is a vehicle with an airbag deployed ahead. Would you like to search for a new route?" In another example, the message template 506 linked to the cue condition 404 representing the traffic speed change 414 based on the traffic slowing down can present "There is a traffic jam ahead. Would you like to search for a new route?"

For a different example, the message template 506 can also be linked to the accident avoidance preference 312 of FIG. 3, the speed preference 318 of FIG. 3, the event schedule 322 of FIG. 3, or a combination thereof. The message template 506 linked to the cue condition 404, the trigger event 402, or a combination thereof is not limited to linking with the cue condition 404 representing the emergency situation 410. For example, the message template 506 can be linked to other types of the cue condition 404 as well. The examples of the message template 506 linked to other types of the cue condition 404 will be described below.

An operation mode 510 is defined as a predetermined method of operation of the navigation system 100. For example, the operation mode 510 can represent various methods of listening to an operation input 516. For a specific example, the operation mode 510 can represent a wait mode 512, a listen mode 514, or a combination thereof. For example, the navigation system 100 can operate the first device 102 in the wait mode 512 as a default configuration. In this example, based on detecting the trigger event 402, the navigation system 100 can select the operation mode 510 representing the listen mode 514.

The wait mode 512 is defined as the operation mode 510 to ignore an input from the user. For example, the first device 102 operating in the wait mode 512 can ignore the operation input 516 received by the navigation system 100. For a specific example, the first device 102 operating in the wait mode 512 can turn off or disconnect the connection with a microphone used for capturing the verbal command from the user. In another example, the first device 102 operating in the wait mode 512 can turn off a camera used for capturing the gesture command from the user. In a different example, the first device 102 operating in the wait mode 512 can turn off a touch screen used for capturing the touch command from the user.

The listen mode 514 is defined as the operation mode 510 for accepting the user input. For example, the first device 102 operating in the listen mode 514 can receive the operation input 516 captured by the first device 102 from the user. In a different example, the first device 102 operating in the listen mode 514 can initiate the receiving function of the first device for receiving the operation input 516 from the user. For a specific example, the first device 102 operating in the listen mode 514 can turn on the microphone for capturing the verbal command from the user. In another specific example, the first device 102 operating in the listen mode 514 can turn on the camera for capturing the gesture command, turn on the touch screen for capturing the touch command, or a combination thereof from the user.

The operation input 516 is defined as an action of operating the navigation system 100. For example, the user of the first device 102 can control the first device 102 of the navigation system 100 by communicating the operation input 516. For a specific example, the operation input 516 can affirm or reject an inquiry presented by the navigation system 100 to the user. For a specific example, the operation input 516 of "YES" can represent an affirmation to the inquiry presented by the first device 102. In a different specific example, the operation input 516 of "NO" can represent a rejection to the inquiry presented by the first device 102.

In another specific example, the operation input 516 can represent an instruction for operating the first device 102 in a natural language form. In this specific example, the operation input 516 can be presented in the alphanumeric value of A through Z, 0 through 9, or a combination thereof. For a specific example, "I would like to pick up a coffee before reaching my destination. Can you find a store on the way?" can represent an example of the operation input 516 in the natural language form. In this specific example, the operation input 516 can request the navigation system 100 to search for a POI who sells coffee along the drive route 222 of FIG. 2 between the current location 208 and the destination point 226 of FIG. 2.

Figure 6:
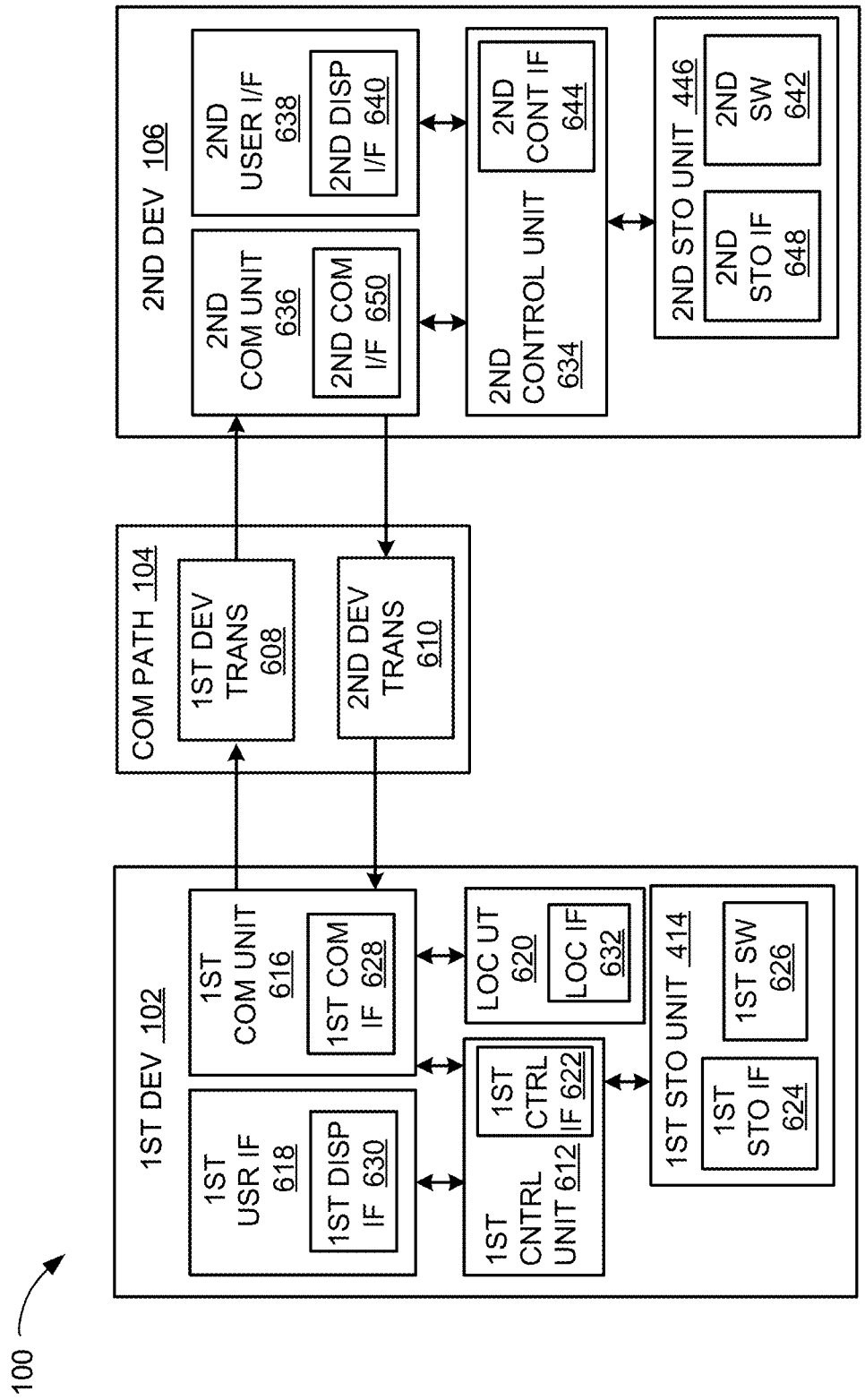
FIG. 6 is an exemplary block diagram of the navigation system.

Referring now to FIG. 6, therein is shown an exemplary block diagram of the navigation system 100. The navigation system 100 can include the first device 102, the communication path 104, and the second device 106. The first device 102 can send information in a first device transmission 608 over the communication path 104 to the second device 106. The second device 106 can send information in a second device transmission 610 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 612, a first storage unit 614, a first communication unit 616, a first user interface 618, and a location unit 620. The first control unit 612 can include a first control interface 622. The first control unit 612 can execute a first software 626 to provide the intelligence of the navigation system 100. The first control unit 612 can be implemented in a number of different manners. For example, the first control unit 612 can be a processor, an embedded processor, a microprocessor, a hardware control logic, a hardware finite state machine (FSM), a digital signal processor (DSP), or a combination thereof. The first control interface 622 can be used for communication between the first control unit 612 and other functional units in the first device 102. The first control interface 622 can also be used for communication that is external to the first device 102.

The first control interface 622 can receive information from the other functional units or from external sources, or can transmit information to the other functional units or to external destinations. The external sources and the external destinations refer to sources and destinations physically separate from the first device 102.

The first control interface 622 can be implemented in different ways and can include different implementations depending on which functional units or external units are being interfaced with the first control interface 622. For example, the first control interface 622 can be implemented with a pressure sensor, an inertial sensor, a microelectromechanical system (MEMS), optical circuitry, waveguides, wireless circuitry, wireline circuitry, or a combination thereof.

The location unit 620 can generate location information, current heading, and current speed of the first device 102, as examples. The location unit 620 can be implemented in many ways. For example, the location unit 620 can function as at least a part of a global positioning system (GPS), an inertial navigation system, a cellular-tower location system, a pressure location system, or any combination thereof.

The location unit 620 can include a location interface 632. The location interface 632 can be used for communication between the location unit 620 and other functional units in the first device 102. The location interface 632 can also be used for communication that is external to the first device 102.

The location interface 632 can receive information from the other functional units or from external sources, or can transmit information to the other functional units or to external destinations. The external sources and the external destinations refer to sources and destinations physically separate from the first device 102.

The location interface 632 can include different implementations depending on which functional units or external units are being interfaced with the location unit 620. The location interface 632 can be implemented with technologies and techniques similar to the implementation of the first control interface 622.

The first storage unit 614 can store the first software 626. The first storage unit 614 can also store the relevant information, such as advertisements, points of interest (POI), navigation routing entries, or any combination thereof.

The first storage unit 614 can be a volatile memory, a nonvolatile memory, an internal memory, an external memory, or a combination thereof. For example, the first storage unit 614 can be a nonvolatile storage such as non-volatile random access memory (NVRAM), Flash memory, disk storage, or a volatile storage such as static random access memory (SRAM).

The first storage unit 614 can include a first storage interface 624. The first storage interface 624 can be used for communication between the location unit 620 and other functional units in the first device 102. The first storage interface 624 can also be used for communication that is external to the first device 102.

The first storage interface 624 can receive information from the other functional units or from external sources, or can transmit information to the other functional units or to external destinations. The external sources and the external destinations refer to sources and destinations physically separate from the first device 102.

The first storage interface 624 can include different implementations depending on which functional units or external units are being interfaced with the first storage unit 614. The first storage interface 624 can be implemented with technologies and techniques similar to the implementation of the first control interface 622.

The first communication unit 616 can enable external communication to and from the first device 102. For example, the first communication unit 616 can permit the first device 102 to communicate with the second device 106, an attachment, such as a peripheral device or a computer desktop, and the communication path 104.

The first communication unit 616 can also function as a communication hub allowing the first device 102 to function as part of the communication path 104 and not limited to be an end point or terminal unit to the communication path 104. The first communication unit 616 can include active and passive components, such as microelectronics or an antenna, for interaction with the communication path 104.

The first communication unit 616 can include a first communication interface 628. The first communication interface 628 can be used for communication between the first communication unit 616 and other functional units in the first device 102. The first communication interface 628 can receive information from the other functional units or can transmit information to the other functional units.

The first communication interface 628 can include different implementations depending on which functional units are being interfaced with the first communication unit 616. The first communication interface 628 can be implemented with technologies and techniques similar to the implementation of the first control interface 622.

The first user interface 618 allows a user (not shown) to interface and interact with the first device 102. The first user interface 618 can include an input device and an output device. Examples of the input device of the first user interface 618 can include a keypad, a touchpad, soft-keys, a keyboard, a microphone, a camera, or any combination thereof to provide data and communication inputs. Examples of the first user interface 618 can further include a digital camera, video camera, thermal camera, night vision camera, infrared camera, x-ray camera, or the combination thereof. Examples of the first user interface 618 can also include accelerometer, thermometer, microphone, wireless signal receiver, remote physiological monitoring device, light identifier, or the combination thereof.

The first user interface 618 can include a first display interface 630. The first display interface 630 can include a display, a projector, a video screen, a speaker, a headset, or any combination thereof.

The first control unit 612 can operate the first user interface 618 to display information generated by the navigation system 100. The first control unit 612 can also execute the first software 626 for the other functions of the navigation system 100, including receiving location information from the location unit 620. The first control unit 612 can further execute the first software 626 for interaction with the communication path 104 via the first communication unit 616.

The second device 106 can be optimized for implementing the present invention in a multiple device embodiment with the first device 102. The second device 106 can provide the additional or higher performance processing power compared to the first device 102. The second device 106 can include a second control unit 634, a second communication unit 636, and a second user interface 638.

The second user interface 638 allows a user (not shown) to interface and interact with the second device 106. The second user interface 638 can include an input device and an output device. Examples of the input device of the second user interface 638 can include a keypad, a touchpad, soft-keys, a keyboard, a microphone, a camera, or any combination thereof to provide data and communication inputs. Examples of the second user interface 638 can further include a digital camera, video camera, thermal camera, night vision camera, infrared camera, x-ray camera, or the combination thereof. Examples of the second user interface 638 can also include accelerometer, thermometer, microphone, wireless signal receiver, remote physiological monitoring device, light identifier, or the combination thereof. Examples of the output device of the second user interface 638 can include a second display interface 640. The second display interface 640 can include a display, a projector, a video screen, a speaker, a headset, or any combination thereof.

The second control unit 634 can execute a second software 642 to provide the intelligence of the second device 106 of the navigation system 100. The second software 642 can operate in conjunction with the first software 626. The second control unit 634 can provide additional performance compared to the first control unit 612.

The second control unit 634 can operate the second user interface 638 to display information. The second control unit 634 can also execute the second software 642 for the other functions of the navigation system 100, including operating the second communication unit 636 to communicate with the first device 102 over the communication path 104.

The second control unit 634 can be implemented in a number of different manners. For example, the second control unit 634 can be a processor, an embedded processor, a microprocessor, a hardware control logic, a hardware finite state machine (FSM), a digital signal processor (DSP), or a combination thereof.

The second control unit 634 can include a second control interface 644. The second control interface 644 can be used for communication between the second control unit 634 and other functional units in the second device 106. The second control interface 644 can also be used for communication that is external to the second device 106.

The second control interface 644 can receive information from the other functional units or from external sources, or can transmit information to the other functional units or to external destinations. The external sources and the external destinations refer to sources and destinations physically separate from the second device 106.

The second control interface 644 can be implemented in different ways and can include different implementations depending on which functional units or external units are being interfaced with the second control interface 644. For example, the second control interface 644 can be implemented with a pressure sensor, an inertial sensor, a microelectromechanical system (MEMS), optical circuitry, waveguides, wireless circuitry, wireline circuitry, or a combination thereof.

A second storage unit 646 can store the second software 642. The second storage unit 646 can also store the relevant information, such as advertisements, points of interest (POI), navigation routing entries, or any combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the navigation system 100 is shown with the second storage unit 646 as a single hierarchy storage system, although it is understood that the navigation system 100 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as non-volatile random access memory (NVRAM), Flash memory, disk storage, or a volatile storage such as static random access memory (SRAM).

The second storage unit 646 can include a second storage interface 648. The second storage interface 648 can be used for communication between the location unit 620 and other functional units in the second device 106. The second storage interface 648 can also be used for communication that is external to the second device 106.

The second storage interface 648 can receive information from the other functional units or from external sources, or can transmit information to the other functional units or to external destinations. The external sources and the external destinations refer to sources and destinations physically separate from the second device 106.

The second storage interface 648 can include different implementations depending on which functional units or external units are being interfaced with the second storage unit 646. The second storage interface 648 can be implemented with technologies and techniques similar to the implementation of the second control interface 644.

The second communication unit 636 can enable external communication to and from the second device 106. For example, the second communication unit 636 can permit the second device 106 to communicate with the first device 102 over the communication path 104.

The second communication unit 636 can also function as a communication hub allowing the second device 106 to function as part of the communication path 104 and not limited to be an end point or terminal unit to the communication path 104. The second communication unit 636 can include active and passive components, such as microelectronics or an antenna, for interaction with the communication path 104.

The second communication unit 636 can include a second communication interface 650. The second communication interface 650 can be used for communication between the second communication unit 636 and other functional units in the second device 106. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second control interface 644.

The first communication unit 616 can couple with the communication path 104 to send information to the second device 106 in the first device transmission 608. The second device 106 can receive information in the second communication unit 636 from the first device transmission 608 of the communication path 104.

The second communication unit 636 can couple with the communication path 104 to send information to the first device 102 in the second device transmission 610. The first device 102 can receive information in the first communication unit 616 from the second device transmission 610 of the communication path 104. The navigation system 100 can be executed by the first control unit 612, the second control unit 634, or a combination thereof.

For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 106 can include other functional units not shown in FIG. 6 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 620, although it is understood that the second device 106 can also operate the location unit 620.

Figure 7:
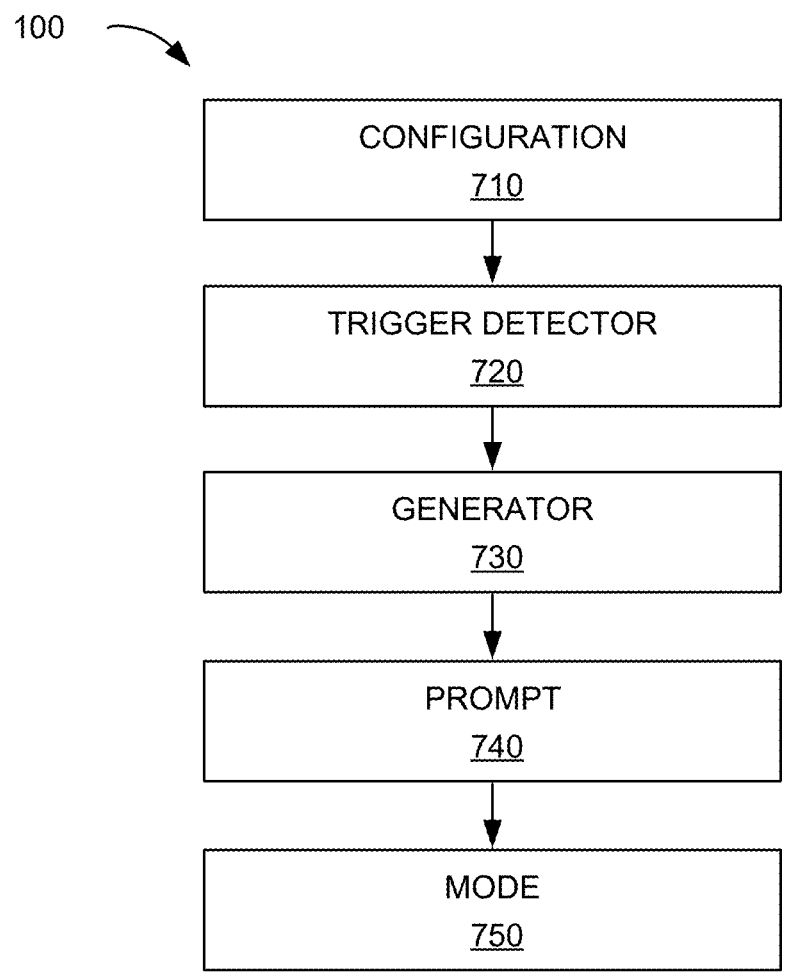
FIG. 7 is a control flow of the navigation system.

Referring now to FIG. 7, therein is shown a control flow of the navigation system 100. The navigation system 100 can include a configuration module 710. The configuration module 710 configures the navigation system 100. The configuration module 710 can configure the navigation system 100 in various ways. For example, the configuration module 710 can configure the navigation system 100 based on determining the context information 202 of FIG. 2 including the navigation information 204 of FIG. 2. In this example, the configuration module 710 can determine the navigation information 204 including the status information 206 of FIG. 2, the map information 214 of FIG. 2, the route information 220 of FIG. 2, the updating information 234 of FIG. 2, or a combination thereof.

The configuration module 710 can determine the status information 206 in a number of ways. For example, the configuration module 710 can determine the status information 206 including the current location 208 of FIG. 2 based on a GPS, a location beacon, a cellular signal, an inertial measurement unit (IMU), or a combination thereof. In this example, the configuration module 710 can determine the current location 208 based on a movement tracking, a position trilateration, or a combination thereof through the location unit 620 of FIG. 6.

The configuration module 710 can determine the physical location 210 FIG. 2 of things and places based on the Cartesian coordinate system. For example, the direction denoted by "x" of FIG. 2 can represent the horizontal component and the direction denoted by "y" of FIG. 2 can represent the vertical component of the physical location 210 on the map 216 of FIG. 2. For example, an increase in the value of "x" can represent the physical location 210 in the eastern direction of the geographical area, positively increasing in the longitudinal value. Continuing in this example, an increase in the value of "y" can represent the physical location 210 in the northern direction of the geographical area, positively increasing in the latitude value.

The configuration module 710 can determine the current time 212 in various ways. For example, the configuration module 710 can determine the current time 212 by retrieving the current time 212 from the atomic clock, a mechanical clock, a quartz clock, a centralized time server based on the time zone where the first device 102 is located, or a combination thereof.

The configuration module 710 can determine the movement direction 250 in various ways. For example, the configuration module 710 can determine the movement direction 250 based on the reading of a compass, the direction of the movement of the user of the first device 102 using a gyro sensor, or a combination thereof. In this example, the configuration module 710 can determine the movement direction 250 as a direction presented in the cardinal direction, a value represented for the points of the compass, or a combination thereof. For example of the direction presented in the cardinal direction, the configuration module 710 can determine the movement direction 250 represented as north (N), east (E), south (S), west (W), or a combination thereof. In another example, based on the point of compass, the configuration module 710 can determine the movement direction 250 represented as a value between 0-degree and 360-degree.

In another example, the configuration module 710 can determine the movement direction 250 based on the current location 208, the map 216, the POI located in the direction of the movement of the user of the first device 102, or a combination thereof. For a specific example, based on the Cartesian coordinate, the configuration module 710 can determine the current location 208 as "37.3357, −121.8916" on E Santa Clara Street, California. In this specific example, the configuration module 710 can further determine the direction of the movement of the user as "northeast" using the gyro sensor. Continuing in this specific example, the configuration module 710 can scan the map 216 to determine the San Jose City Hall, California as the POI located in the direction of the movement of the user to determine the San Jose City Hall. In this specific example, the configuration module 710 can determine the San Jose City Hall as the movement direction 250.

The configuration module 710 can determine the travel movement 252 in various ways. For example, the configuration module 710 can determine the travel movement 252 based on the movement detected by the motion detector including a passive infrared sensor, a microwave sensor, an ultrasonic sensor, a tomographic motion detector, a video camera, a gyro sensor, or a combination thereof. In another example, the configuration module 710 can determine the travel movement 252 based on a change in the current location 252. In this example, the configuration module 710 can dynamically compare the current location 252 over time. For a specific example, the configuration module 710 can determine the current location 252 as location A at time 0. Continuing in this specific example, the configuration module 710 can determine the current location 710 as location B at time 1. In this specific example, the configuration module 710 can determine the travel movement 252 based on the change in the current location 252 from A to B over time of 1.

The configuration module 710 can determine the map information 214. The configuration module 710 can determine the map information 214 based on the map 216. For example, the configuration module 710 can extrapolate the map information 214 including a road sign, a traffic signal, a highway ramp, or a combination thereof from the map 216.

For a specific example, the configuration module 710 can scan the map 216 to extrapolate the map information 214. In this specific example, the configuration module 710 can scan the map 216 to extrapolate the map information 214 representing a feature and the physical location 210 of the map information 214. For example, the configuration module 710 can scan the map 216 and extrapolate the feature representing the traffic signal and the physical location 210 of "44.0456, −122.9307" in Springfield, Oreg., 97478. The configuration module 710 is not limited to extrapolating the feature such as a traffic signal and can extrapolate various other features from the map 216 as discussed above.

The configuration module 710 can determine the route information 220 including the drive route 222 of FIG. 2, the past route 228 of FIG. 2, the remaining distance 244 of FIG. 2, the departure time 230 of FIG. 2, or a combination thereof. The configuration module 710 can determine the drive route 222 in various ways.

For example, the configuration module 710 can determine the drive route 222 based on the physical location 210 representing the start point 224 of FIG. 2, the destination point 226 of FIG. 2, or a combination thereof. In this example, the configuration module 710 can determine the drive route 222 based on the path 218 of FIG. 2 between the start point 224 and the destination point 226.

For a specific example, the configuration module 710 can retrieve the start point 224 denoted as A of FIG. 4 and the destination point 226 denoted as D of FIG. 4 from the second device 106 of FIG. 1 through the first communication unit 616 of FIG. 6, from the first storage unit 614 of FIG. 6, or a combination thereof. In this specific example, the configuration module 710 can determine the path 218 between A and D as the drive route 222.

In another example, the configuration module 710 can also determine the drive route 222 based on the path 218 between the current location 208 and the destination point 226 when the start point 224 is not determined. For a specific example, the configuration module 710 can determine the current location 208 presented as the vehicle 1 of FIG. 4 by retrieving the current location 208 from the first location unit 620. Continuing in this specific example, the configuration module 710 can determine the path 218 between the current location 208 and the destination point 226 presented as D of FIG. 4 as the drive route 222.

In another example, the configuration module 710 can determine the past route 228 based on retrieving the previously traveled instance of the path 218 from the first storage unit 614, the second device 106 through the first communication unit 616, or a combination thereof. For a specific example, the previously traveled instance of the path 218 can be the path 218 between the previously departed instance of the start point 224 denoted A of FIG. 4 and the previously traveled instance of the destination point 226 denoted P of FIG. 4.

The configuration module 710 can determine the remaining distance 244 in various ways. For example, the configuration module 710 can determine the remaining distance 244 based on the distance between the current location 208 and the physical location 210 destined by the user. In this example, the configuration module 710 can measure the distance between the current location 208 and the destination point 226 along the drive route 222 to determine the remaining distance 244. In another example, the configuration module 710 can measure the rectilinear distance between the current location 208 and the destination point 226 to determine the remaining distance 244.

In a further example, the configuration module 710 can determine the departure time 230 based on the driving time 232 of FIG. 2 and a pre-determined instance of the arrival time 246 of FIG. 2. In this example, the configuration module 710 can determine the departure time 230 by subtracting the driving time 232 from the pre-determined instance of the arrival time 246. For a specific example, the configuration module 710 can retrieve the pre-determined instance of the arrival time 246 of 5:00 PM and the driving time 232 to the destination point 226 as 1 hour and 30 minutes. By subtracting the driving time 232 of 1 hour and 30 minutes from the arrival time 246 of 5:00 PM, the configuration module 710 can determine the departure time 230 as 3:30 PM. In a different specific example, the configuration module 710 can retrieve the departure time 230 from the user. For example, the configuration module 710 can retrieve "3:30 PM" representing the departure time 230 of 3:30 PM from the user through the first user interface 618 of FIG. 6.

In another example, the configuration module 710 can determine the route information 220 representing driving time 232, the arrival time 246, or a combination thereof. The configuration module 710 can determine the driving time 232, the arrival time 246, or a combination thereof in various ways.

For example, the configuration module 710 can retrieve the driving time 232, the departure time 230, or a combination thereof of the previously traveled instance of the path 218 from the first storage unit 614, from the second device 106 through the first communication unit 616, or a combination thereof. For a specific example, the configuration module 710 can retrieve "1 hour 30 minutes, depart 3:30 PM" for the driving time 232 of 1 hour and 30 minutes, and the departure time 230 of 3:30 PM for the previously traveled instance of the path 218.

In a different example, the configuration module 710 can determine the driving time 232 based on the distance of the drive route 222 and an estimated speed of travel. For example, the configuration module 710 can determine the estimated speed of travel based on an average speed of the vehicles traveling on the drive route 222. For a specific example, the configuration module 710 can determine the distance of the drive route 222 as 100 km and the estimated speed of travel on the drive route 222 as 50 km/hr based on the average vehicle speed on the drive route 222. Continuing in this specific example, the configuration module can divide the 100 km by the estimated speed of travel of 50 km/hr to determine the driving time 232 of 2 hours.

In another example, the configuration module 710 can determine the arrival time 246 based on retrieving the arrival time 246 from the user through the first user interface 618, the first storage unit 614, the second device 106 through the first communication unit 616, or a combination thereof. In a different example, the configuration module 710 can determine the arrival time 246 based on the current time 212, the traffic speed 240, the current speed of the user of the first device 102, the remaining distance 244, or a combination thereof.

The configuration module 710 can further determine the route information 220 representing the projected route 248 of FIG. 2, the missing destination 254 of FIG, 2, or a combination thereof. The configuration module 710 can determine the projected route 248 in various ways. For example, the configuration module 710 can determine the projected route 248 based on the current location 208, the drive route 222, the movement direction 250, the map 216, the past route 228, or a combination thereof.

For a specific example, the configuration module 710 can determine the projected route 248 based on the current location 208, the movement direction 250, the map 216, or a combination thereof. In this specific example, the configuration module 710 can scan the map 216 to determine the path 218 in the direction of the movement direction 250 from the current location 208 as the projected route 248. For example, the configuration module 710 can determine the current location 208 and the movement direction 250 in the eastern direction. In this example, the configuration module 710 can determine the path 218 in the eastern direction from the current location 208 as the projected route 248.

For a different example, the configuration module 710 can determine the projected route 248 based on the drive route 222. In this example, the configuration module 710 can determine the path 218 between the current location 208 and the destination point 226 along the drive route 222 as the projected route 248.

In another example, the configuration module 710 can determine the projected route 248 based on the current location 208, the past route 228, or a combination thereof. In this example, the configuration module 710 can retrieve the past route 228 from the first device 102, retrieve the past route 228 from the second device 106 through the first communication unit 616, or a combination thereof. Continuing in this example, the configuration module 710 can compare the current location 208 and the past route 228 to determine the location overlap 406 of FIG. 4. Based on determining the location overlap 406, the configuration module 710 can determine the path 218 between the current location 208 and the destination point 226 along the past route 228 as the projected route 248.

The configuration module 710 can determine the missing destination 254 based on the route information 220. In this example, the configuration module 710 can retrieve the route information 220 from the first device 102, the second device 106 through the first communication unit 616, or a combination thereof. Continuing in this example, the configuration module 710 can scan the route information 220 for the stored instance of the destination point 226. Based on determining the absence of the destination point 226, the configuration module 710 can determine the missing destination 254.

In another example, the configuration module 710 can also determine the navigation information 204 including the updating information 234. In this example, the configuration module 710 can determine the updating information 234 based on retrieving the updating information 234 from the second device 106 through the first communication unit 616, from the user through the first user interface 618, or a combination thereof. The configuration module 710 can determine the updating information 234 representing the construction location 236 of FIG. 2, the emergency information 238 of FIG. 2, the traffic speed 240 of FIG. 2, or a combination thereof.

For example, the configuration module 710 can determine the updating information 234 representing the construction location 236 based on determining the physical location 210 of the construction site. In this example, the configuration module 710 can retrieve the alphanumeric value of A through Z, 0 through 9, or a combination thereof representing the physical location 210 of the construction site from the second device 106 through the first communication unit 616. For a specific example, the configuration module 710 can retrieve the physical location 210 in the Cartesian coordinate of "37.4536, −122.1278" to determine the construction site located at the US-101 in East Palo Alto, Calif., 94303 near the crossing of the San Francisquito River. In a different example, the configuration module 710 can capture the operation input 516 of FIG. 5 of the physical location 210 of the construction site to store in the first storage unit 614 for later retrieval.

For another example, the configuration module 710 can determine the emergency information 238 based on determining the physical location 210 of the emergency situation 410 of FIG. 4. In this example, the configuration module 710 can retrieve the physical location 210 of the emergency situation 410 from the second device 106 through the first communication unit 616. Continuing in this example, the configuration module 710 can also retrieve the emergency type of the emergency situation 410 representing the "airbags-deployed," the "flat tire," or a combination thereof.

For a different example, the configuration module 710 can determine the updating information 234 representing the traffic speed 240 based on retrieving the average speed of the vehicle traveling the path 218 from the second device 106. In this example, the configuration module 710 can retrieve the alphanumeric value of A through Z, 0 through 9, or a combination thereof representing the path 218, the average speed of the vehicles traveling the path 218, or a combination thereof from the second device 106 through the first communication unit 616.

For a specific example, the configuration module 710 can retrieve the traffic speed 240 based on the vehicles traveling the San Francisco (SF)–Oakland Bay Bridge. In this specific example, the configuration module 710 can retrieve "37.8251, −122.3140 to 37.7882, −1223885; 65 MPH" as the path 218 and the average speed of the vehicles traveling the bridge from the second device 106 through the first communication unit 616. In this example, the configuration module 710 can determine the average speed of the vehicles traveling at 65 MPH as the traffic speed 240 from the Oakland, Calif. side of the SF—Oakland Bay Bridge to the San Francisco, Calif. side of the bridge.

In another example, the configuration module 710 can determine the updating information 234 representing the fuel remainder 242. In this example, the configuration module 710 can determine the fuel remainder 242 based on the amount of fuel left in the fuel tank of the vehicle, from the second device 106 through the first communication unit 616, or a combination thereof. For example, the configuration module 710 can determine fuel left in the fuel tank based on measuring the fuel left in the fuel tank, calculating the amount of fuel consumed, or a combination thereof.

The configuration module can determine the updating information 234 representing the accident vehicle number 256 in various ways. For example, the configuration module 710 can determine the accident vehicle number 256 based on the number of vehicles collided in the accident, number of other vehicle such as an emergency service vehicle present at the accident site, or a combination thereof.

In this example, the configuration module 710 can retrieve the number and the physical location 210 of the vehicles collided in the accident, other vehicles present in the accident site, or a combination thereof from the second device 106 through the first communication unit 616. Continuing in this example, the configuration module 710 can compare the physical location 210 of the accident site and the projected route 248 to determine the location overlap 406. Based on determining the location overlap 406, the configuration module 710 can determine the number of vehicles collided in the accident, the number of other vehicles present at the accident site, or a combination thereof as the accident vehicle number 256.

For a specific example, the number of vehicles collided in the accident can be 5 and the number of other vehicles present at the accident site can be 2. Continuing in this specific example, the configuration module 710 can determine the location overlap 406 between the physical location 210 of the accident site and the projected route 248. In this specific example, the configuration module 710 can determine the accident vehicle number 256 as 5 from the vehicles collided, 2 from the other vehicles present at the accident site, or 7 from the sum of vehicles.

The configuration module 710 can also determine the context information 202 including the user information 302 of FIG. 3. In this example, the configuration module 710 can determine the user information 302 representing the user navigation history 304 of FIG. 3, the user provided information 310 of FIG. 3, or a combination thereof. The configuration module 710 can determine the user information 302 in various ways.

For example, the configuration module 710 can determine the user navigation history 304 by retrieving the user navigation history 304 from the first storage unit 614, from the second device through the first communication unit 616, or a combination thereof. In this example, the configuration module 710 can retrieve the user navigation history 304 representing the past trip 306 of FIG. 3, the past dining time 308 of FIG. 3, or a combination thereof from the first storage unit 614, the second device 106 through the first communication unit 616, or a combination thereof.

For example, the configuration module 710 can retrieve the user navigation history 304 representing the past trip 306. For a specific example, the configuration module 710 can retrieve "1, Sausalito, San Francisco, Calif., 94105, USA, 50×, 0700-0730" representing the San Francisco Ferry Building located in San Francisco, Calif. as the past trip 306 traveled by the user 50 times between 07:00 AM and 07:30 AM. In the same specific example, the configuration module 710 can also retrieve "650, Parker Ave, San Francisco, Calif., 94118, 15×, 0700-0730" representing the St. Ignatius Church located in San Francisco, Calif. as the past trip 306 traveled by the user 15 times between 07:00 AM between 07:30 AM.

For a different specific example, the configuration module 710 can retrieve the user navigation history 304 representing the past dining time 308. For example, the configuration module 710 can retrieve "20×, 1130" representing the past dining time 308 where the user began traveling to a dining facility 25 times at 11:30 AM from the first storage unit 614, the second device 106 through the first communication unit 616, or a combination thereof. In a different specific example, the configuration module 710 can retrieve "5×, 1330" representing another instance of the past dining time 308 traveled by the user 5 times at 1:30 PM.

In another example, the configuration module 710 can determine the user provided information 310 based on retrieving the user provided information 310 from the first storage unit 614, the second device 106 through the first communication unit 616, or a combination thereof. In a different example, the configuration module 710 can determine the user provided information 310 based on capturing the user provided information 310 from the first user interface 618. In these examples, the configuration module 710 can determine the user provided information 310 representing the accident avoidance preference 312 of FIG. 3, the accident number threshold 314 of FIG. 3, the accident likelihood threshold 316 of FIG. 3, or a combination thereof. Further in these examples, the configuration module 710 can also determine the user provided information 310 representing the speed preference 318 of FIG. 3, traffic speed threshold 320 of FIG. 3, the event schedule 322 of FIG. 3, or a combination thereof.

The configuration module 710 can retrieve the user provided information 310 representing the accident avoidance preference 312, the accident number threshold 314, the accident likelihood threshold 316, or a combination thereof in various ways. For example, the configuration module 710 can retrieve the accident avoidance preference 312 from the first storage unit 614, the second device 106 through the first communication unit 616, the first user interface 618, or a combination thereof. For a specific example, the configuration module 710 can retrieve "HIGH," "LOW," or a combination thereof representing the accident avoidance preference 312 of high importance, low importance, or a combination thereof.

The configuration module 710 can retrieve the accident number threshold 314 in various ways. For example, the configuration module 710 can retrieve the accident avoidance preference 312 from the first storage unit 614, the second device 106 through the first communication unit 616, the user input retrieved through the first user interface 618, or a combination thereof. For a specific example, the configuration module 710 can retrieve "3 VEHICLES" representing the accident number threshold 314 of three vehicles involved in the accident.

The accident number threshold 314 is not limited to the values in the example above. For example, the configuration module 710 can determine different number of vehicles as the accident number threshold 314 based on the values stored in the first storage unit 614, the user input retrieved through the first user interface 618, the second device 106 retrieved through the first communication unit 616, or a combination thereof.

The configuration module 710 can determine the accident likelihood threshold 316 in various ways. For example, the configuration module 710 can determine the accident likelihood threshold 316 based on retrieving the accident likelihood threshold 316 from the first storage unit 614, the second device 106 through the first communication unit 616, the user through the first user interface 618, or a combination thereof. For a specific example, the configuration module 710 can retrieve "4 ACCIDENTS PER MONTH" representing the accident likelihood threshold 316 of four accidents occurring on average in a month.

The accident likelihood threshold 316 is not limited to the values in the example above. For example, the configuration module 710 can determine different numbers of vehicles as the accident likelihood threshold 316 based on the values stored in the first storage unit 614, the user retrieved through the first user interface 618, the second device 106 retrieved through the first communication unit 616, or a combination thereof.

For another example, the configuration module 710 can retrieve the user provided information 310 representing the speed preference 318 in various ways. For example, the configuration module 710 can retrieve the alphanumeric value of A to Z, 0 to 9, or a combination thereof representing the speed preference 318. For a specific example, the configuration module 710 can retrieve FAST representing the speed preference 318 of the user to drive fast. In a different example, the configuration module 710 can retrieve SLOW representing the speed preference 318 of the user to drive slowly. In these specific examples, the configuration module 710 can retrieve the speed preference 318 from the first storage unit 614, the second device 106 through the first communication unit 616, the first user interface 618, or a combination thereof.

The configuration module 710 can determine the user provided information 310 representing the traffic speed threshold 320 in various ways. For example, the configuration module 710 can determine the traffic speed threshold 320 based on retrieving the traffic speed threshold 320 from the first storage unit 614, the second device 106 through the first communication unit 616, the first user interface 618, or a combination thereof. For a specific example, the configuration module 710 can retrieve "60 KM" for the traffic speed threshold 320 of 60 kilometers per hour. In another specific example, the configuration module 710 can retrieve "100 KM" for the traffic speed threshold 320 of 100 kilometers per hour. The traffic speed threshold 320 is not limited to the values in the example above. For example, the configuration module 710 can determine different speed as the traffic speed threshold 320 based on the values retrieved from the first storage unit 614, the user through the first user interface 618, the second device 106 through the first communication unit 616, or a combination thereof.

The configuration module 710 can also determine the user provided information 310 representing the fast speed threshold 334 of FIG. 3 in various ways. For example, the configuration module 710 can determine the fast speed threshold 334 based on retrieving the fast speed threshold 334 from the first storage unit 614, the second device 106 through the first communication unit 616, the first user interface 618, or a combination thereof. For a specific example, the configuration module 710 can retrieve "130 KM" for the fast speed threshold 334 of 130 kilometers per hour. In another specific example, the configuration module 710 can retrieve "130 KM" for the fast speed threshold 320 of 130 kilometers per hour. The fast speed threshold 334 is not limited to the values in the example above. For example, the configuration module 710 can determine the differing speed as the fast speed threshold 334 based on the values retrieved from the first storage unit 614, the user through the first user interface 618, the second device 106 through the first communication unit 616, or a combination thereof.

The configuration module 710 can also determine the slow speed threshold 336 of FIG. 3 in various ways. For example, the configuration module 710 can determine the slow speed threshold 336 based on retrieving the slow speed threshold 336 from the first storage unit 614, the second device 106 through the first communication unit 616, the first user interface 618, or a combination thereof. For a specific example, the configuration module 710 can retrieve "20 KM" for the slow speed threshold 336 of 20 kilometers per hour. In another specific example, the configuration module 710 can retrieve "10 KM" for the slow speed threshold 336 of 10 kilometers per hour. The slow speed threshold 336 is not limited to the values in the example above. For example, the configuration module 710 can determine the differing speed as the slow speed threshold 336 based on the values retrieved from the first storage unit 614, the user through the first user interface 618, the second device 106 through the first communication unit 616, or a combination thereof.

In a further example, the configuration module 710 can retrieve the user provided information 310 representing the event schedule 322. The configuration module 710 can retrieve the event schedule 322 including the event time 324 of FIG. 3, the event name 326 of FIG. 3, the event location 328 of FIG. 3, or a combination thereof.

For example, the configuration module 710 can retrieve the event schedule 322 from the first storage unit 614, the second device 106 through the first communication unit 616, or a combination thereof. In this example, the configuration module 710 can retrieve the event schedule 322 from the first storage unit 614 representing the hard drive, the memory, or a combination thereof of the first device 102 of FIG. 1. In another example, the configuration module 710 can also retrieve the event schedule 322 from the second device 106 using services such as an online scheduler representing the Google Calendar™, an email stored in the mail server, or a combination thereof through the first communication unit 616.

For example, the configuration module 710 can retrieve the alphanumeric value of A through Z, 0 through 9, or a combination thereof representing the event schedule 322. For a specific example, the configuration module 710 can retrieve the event schedule 322 based on retrieving "1 Ferry Bldg. Marketplace, San Francisco, Calif. 94111" representing the event location 328 and "10:00 AM, Aug. 27, 2015" representing the event time 324. Continuing in the same specific example, the configuration module 710 can also retrieve "TACOLICIOUS" representing the event name 326.

The configuration module 710 can communicate the context information 202 including the navigation information 204, the user information 302, or a combination thereof to a trigger-detector module 720. The navigation system 100 can include the trigger-detector module 720, which can couple to the configuration module 710. The trigger-detector module 720 detects the trigger event 402 of FIG. 4.

The trigger-detector module 720 can detect the trigger event 402 in various ways. For example, the trigger-detector module 720 can detect the trigger event 402 based on the context information 202 meeting the cue condition 404 of FIG. 4. In another example, the trigger-detector module 720 can detect the trigger event 402 based on the context information 202 being free of the operation input 516 meeting the cue condition 404.

An example of the reason for excluding the operation input 516 from the context information 202 is for the advantage over the detection of the trigger event 402 based on the context information 202 including the operation input 516 meeting the cue condition 404. For example, by only detecting the trigger event 402 based on the context information 202 being free of the operation input 516, the navigation system 100 can fully automate the detecting of the trigger event 402. By fully automating the detection of the trigger event 402, the switching of the operation mode 510 of FIG. 5 from the wait mode 512 of FIG. 5 to the listen mode 514 of FIG. 5 can also be fully automated and become more efficiently.

It has been discovered that the navigation system 100 switching the operation mode 510 from the wait mode 512 to the listen mode 514 by detecting the trigger event 402 based on the context information 202 being free of the operation input 516 meeting the cue condition 404 improves the functionality of the navigation system 100. For example, by switching the operation mode 510 from the wait mode 512 to the listen mode 514 by detecting the trigger event 402, the navigation system 100 is not required to leave the sensor device such as a button, a microphone, or other inputs on the first device 102 on constantly to capture the operation input 516 provided by the user. By not having the sensor on, reducing the time the sensor is on, or a combination thereof, the navigation system 100 can reduce the overall process imposed on the first device 102. By reducing the overall process imposed on the first device 102, the navigation system 100 can allocate the saved processing power to other function, reduce the energy consumption to extend the operation life of the navigation system 100, or a combination thereof.

The examples below are described as the detection of the trigger event 402 based on the context information 202 meeting the cue condition 404. However, the detection of the trigger event 402 can also be based on the context information 202 meeting the cue condition 404 being free of the operation input 516.

For example, the trigger-detector module 720 can detect the trigger event 402 representing the network sourced trigger 408 of FIG. 4. In this example, the trigger-detector module 720 can detect the network sourced trigger 408 based on the context information 202 meeting the cue condition 404 representing the emergency situation 410 of FIG. 4, the traffic speed change 414 of FIG. 4, the weather condition 416 of FIG. 4, the construction condition 418, or a combination thereof.

For example, the trigger-detector module 720 can detect the network sourced trigger 408 based on the context information 202 meeting the cue condition 404 representing the emergency situation 410. In this example, the second device 106 can detect the hazardous incidents such as an airbag deploying, a flat tire, a vehicle stalling, hazardous objects on the road, or a combination thereof along the path 218 to be traveled by the first device 102, the projected route 248, or a combination thereof. For example, based on detecting the hazardous incident along the path 218 to be traveled by the first device 218, the second device 106 can generate the emergency information 238. In this example, the generated instance of the emergency information 218 can include the physical location 210 of the hazardous incident. After generating the emergency information 238, the second device 106 can communicate the emergency information 238 to the first device 102.

Continuing in this example, the trigger-detector module 720 of the first device 102 can retrieve the emergency information 238 communicated by the second device 106. The trigger-detector module 720 can compare the physical location 210 in the emergency information 238 with the projected route 248. The trigger-detector module 720 can detect the network sourced trigger 408 based on determining the location overlap 406 of FIG. 4 between the physical location 210 of the emergency situation 410 and the projected route 248.

In a different example, the trigger-detector module 720 can detect the network sourced trigger 408 based on the context information 202 meeting the cue condition 404 representing the traffic speed change 414. In this example, the trigger-detector module 720 can monitor the change in the traffic speed 240 to detect the network sourced trigger 408. The trigger-detector module 720 can monitor the traffic speed 240 for a change such as a rapid deceleration, rapid acceleration, or a combination thereof.

For example, the trigger-detector module 720 can detect the network sourced trigger 408 representing the traffic speed change 414 based on detecting the traffic speed 240 of the drive route 222 decreasing from fast to slow. For a specific example, the traffic speed 240 can be fast if the traffic speed 240 is faster than the fast speed threshold 334 of 100 KPH, and the traffic speed 240 can be slow if the traffic speed is slower than the slow speed threshold 336 of 20 KPH. In this specific example, the trigger-detector module 720 can detect the traffic speed change 414 based on the traffic speed 240 changing from 101 KPH to 19 KPH to detect the network sourced trigger 408. The decrease in the traffic speed 240 can be a result of the traffic speed 240 reducing due to a traffic jam, a traffic accident, a roadway construction, or a combination thereof along the drive route 222, the path 218 of the first device 102, or a combination thereof.

In another example, the trigger-detector module 720 can detect the network sourced trigger 408 representing the traffic speed change 414 based on detecting the traffic speed 240 increasing from slow to fast. For a specific example, based on the traffic speed 240 of fast and slow from the previous example, the trigger-detector module 720 can detect the traffic speed change 414 if the traffic speed 240 increases from 19 KPH to 101 KPH to detect the network sourced trigger 408.

In this specific example, the speed of the traffic increasing can be a result of the traffic jam clearing, the traffic accident clearing, the end of the construction zone approaching, or a combination thereof along the drive route 222, the path 218 ahead of the user of the first device 102, or a combination thereof.

The trigger-detector module 720 is not limited to the cruising speed of 55 MPH and the slow speed of 25 MPH as used in the examples. For example, the trigger-detector module 720 can configure the cruising speed and the slow speed to other value and units such as 70 MPH and 30 MPH, respectively, for detecting the network sourced trigger 408.

For a different example, the trigger-detector module 720 can detect the network sourced trigger 408 based on the context information 202 meeting the cue condition 404 representing the weather condition 416. In this example, the trigger-detector module 720 can monitor the change in the physical phenomenon along the drive route 222, the path 218 ahead of the user of the first device 102, or a combination thereof for detecting the network sourced trigger 408.

For a specific example, the second device 106 can determine rain fall using a rain detector. In this example, based on the second device 106 detecting the rain, the second device 106 can communicate the weather condition 416 representing rain and the physical location 210 of where the rain is detected to the trigger-detector module 720.

Continuing in this example, the trigger-detector module 720 can retrieve the weather condition 416 representing rain and the physical location 210 of where the rain is occurring from the second device 106. In this example, the trigger-detector module 720 can compare the drive route 222, the path 218 ahead of the user of the first device 102, or a combination thereof with the physical location 210 of where the rain is occurring. The trigger-detector module 720 can detect the network sourced trigger 408 based on determining the location overlap 406 between the physical location 210 of the rain occurring and the drive route 222, the path 218 ahead of the user of the first device 102, or a combination thereof.

In another example, the trigger-detector module 720 can detect the network sourced trigger 408 based on the context information 202 meeting the cue condition 404 representing the construction condition 418. In this example, the trigger-detector module 720 can receive the construction location 236 from the second device 106 in various ways.

For example, the second device 106 such as a vehicle on the road can detect a roadside construction while traveling and communicate the physical location 210 representing the construction location 236 to the trigger-detector module 720. In another example, the second device 106 such as a centralized construction database system can communicate the construction location 236 stored in the second storage unit 646 to the trigger-detector module 720.

Continuing in this example, the trigger-detector module 720 can compare the construction location 236 with the projected route 248. Based on detecting the location overlap 406 between the construction location 236 and the projected route 248, the trigger-detector module 720 can detect the trigger event 402 representing the construction condition 418.

For a different example, the trigger-detector module 720 can detect the trigger event 402 representing the movement trigger 422 of FIG. 4 based on the context information 202 meeting the cue condition 404 representing the movement trigger 422. In this example, the trigger-detector module 720 can detect the movement trigger 422 based on the context information 202 meeting the cue condition 404 representing the free movement 424 of FIG. 4, the leaving destination 426 of FIG. 4, the low fuel 428 of FIG. 4, or a combination thereof.

For a specific example, the trigger-detector module 720 can detect the movement trigger 422 based on the context information 202 meeting the cue condition 404 representing the free movement 424. In this specific example, the trigger-detector module 720 can detect the movement trigger 422 based on the change in the current location 208 and the missing destination 254 representing the lack the destination point 226 determined by the navigation system 100. More specifically, the trigger-detector module 720 can retrieve the travel movement 252 and the missing destination 254 from the configuration module 710 to determine the context information 202 meeting the cue condition 404 representing the free movement 424.

For a specific example, the current location 208 of the first device 102 can be A of FIG. 4. In this example, the first device 102 can move toward the location B of FIG. 4. In this specific example, if the configuration module 710 communicates the travel movement 252 and the missing destination 254 based on searching the route information 220 of FIG. 2, the trigger-detector module 720 can determine the free movement 424 to detect the movement trigger 422.

In a different specific example, the trigger-detector module 720 can detect the movement trigger 422 based on the context information 202 meeting the cue condition 404 representing the leaving destination 426. In this specific example, the trigger-detector module 720 can compare the current location 208 and the destination point 226. After the location overlap 406 between the current location 208 and the destination point 226 is determined, the trigger-detector module 720 can continue to monitor the current location 208. When a change in the current location 208 moving away from the destination point 226 is detected, the trigger-detector module 720 can detect the movement trigger 422 based on meeting the cue condition 404 representing the leaving destination 426.

For example, the current location 208 of the first device 102 can be C of FIG. 4, and the destination point 226 can be D of FIG. 4. In this example, the first device 102 can arrive at the destination point 226 by navigating to D. After arriving at D, the trigger-detector module 720 can continue to monitor the current location 208. When a change in the current location 208 is thereafter detected, the trigger-detector module 720 can determine the detection of the movement trigger 422 based on meeting the cue condition 404 representing the leaving destination 426.

For another specific example, the trigger-detector module 720 can detect the movement trigger 422 based on the context information 202 meeting the cue condition 404 representing the low fuel 428. In this specific example, the trigger-detector module 720 can determine the low fuel 428 based on the fuel remainder 242 of FIG. 2 of the vehicle becoming low. More specifically, the trigger-detector module 720 can determine the fuel remainder 242 becoming low based on the amount of fuel left in the fuel tank of the vehicle and the fuel level threshold 454 of FIG. 4. In this example, the trigger-detector module 720 can retrieve the fuel level threshold 454 from the first device 102, the second device 106, or a combination thereof.

For example, as a vehicle with the first device 102 travels and consumes fuel, the trigger-detector module 720 can compare the fuel remainder 242 and the fuel level threshold 454. In this example, the trigger-detector module 720 can detect the movement trigger 422 based on determining the amount of the fuel remainder 242 falling is below the fuel level threshold 454 to detect the low fuel 428.

For a specific example, the fuel remainder 242 can initially be determined as 10.0 gallons, and the fuel level threshold 454 can be determined as 2.0 gallons. In this specific example, the vehicle can move and the fuel remainder 242 can decrease from 10 gallons to 1.9 gallons. Based on the fuel remainder 242 falling to the fuel level threshold 454 of 2.0 gallons, the trigger-detector module 720 can detect the movement trigger 422 based on the context information meeting the cue condition 404 representing the low fuel 428.

The trigger-detector module 720 can also detect the movement trigger 422 based on the context information 202 meeting the cue condition 404 representing the destination approaching 430 of FIG. 4, the turn nearby 436 of FIG. 4, or a combination thereof. The trigger-detector module 720 can detect the context information 202 meeting the cue condition 404 representing the destination approaching 430 in various ways.

For example, the trigger-detector module 720 can determine the context information 202 meeting the cue condition 404 representing the destination approaching 430 based on the first device 102 approaching the destination point 226.

For example, the trigger-detector module 720 can determine the destination approaching 430 based on the remaining distance 244, the destination proximity threshold 432 of FIG. 4, or a combination thereof. In this example, the trigger-detector module 720 can determine the destination proximity threshold 432 based on retrieving the destination proximity threshold 432 from the first device 102, the second device 106, or a combination thereof.

Continuing in this example, the trigger-detector module 720 can detect the first device 102 approaching the destination point 226 based on comparing the current location 208 and the destination point 226. For example, the trigger-detector module 720 can determine a decrease in the remaining distance 244 as the first device 102 approaches the destination point 226. Continuing in this example, the trigger-detector module 720 can determine the destination approaching 430 to detect the movement trigger 422 based on the remaining distance 244 decreasing to a distance less than the destination proximity threshold 432.

For a specific example, the trigger-detector module 720 can initially determine the remaining distance 244 as 10,000 meters (M) and retrieve the destination proximity threshold 432 of 3,000 M. In this specific example, the trigger-detector module 720 can determine the decrease in the remaining distance 244 as the first device 102 approach the destination point 226. When the remaining distance 244 is reduced to 2,999 M, a distance less than the destination proximity threshold 432, the trigger-detector module 720 can detect the movement trigger 422 representing the destination approaching 430.

In another example, the trigger-detector module 720 can detect the movement trigger 422 based on the context information 202 meeting the cue condition 404 representing the turn nearby 436. In this example, the trigger-detector module 720 can detect the movement trigger 422 based on the first device 102 approaching a turn.

For example, the trigger-detector module 720 can determine the turn nearby 436 based on the distance to the turn, the turn distance threshold 438 of FIG. 4, or a combination thereof. More specifically, the trigger-detector module 720 can determine the turn nearby 436 based on comparing the turn distance threshold 438 and the distance between the first device 102 and the turn. The trigger-detector module 720 can determine the turn distance threshold 438 based on the distance between the current location 208 and the turn along the drive route 222.

For example, the trigger-detector module 720 can determine the decrease in the distance between the first device 102 and the turn as the first device 102 approaches the turn along the drive route 222. As a result, based on the distance between the first device 102 and the approaching turn decrease to the value of the turn distance threshold 438, the trigger-detector module 720 can detect the turn nearby 436.

For a specific example, the trigger-detector module 720 can determine the turn distance threshold 438 as 500 M and determine the distance to the turn as 2000 M. As the first device 102 approaches the turn, the trigger-detector module 720 can determine the decrease in the distance to the turn. In this specific example, the trigger-detector module 720 can determine the turn nearby 436 when on the distance to the turn decreases to 500 M.

In a different example, the trigger-detector module 720 can detect the user specific trigger 440 of FIG. 4 based on the context information 202 meeting the cue condition 404 representing the predicted dining time 442 of FIG. 4, the predicted destination 444 of FIG. 4, or a combination thereof.

For example, the trigger-detector module 720 can retrieve the past instances of the departure time 230 of the user traveling to a diner from the first storage unit 614, the second device 106 through the first communication unit 616, or a combination thereof. In this example, the trigger-detector module 720 can retrieve the different instances of the departure time 230 for comparison to determine the departure time 230 most often traveled to the diner as the predicted dining time 442. The trigger-detector module 720 can compare the current time 212 and the predicted dining time 442 for the time overlap 452 of FIG. 4 to detect the user specific trigger 440 representing the predicted dining time 442.

For a specific example, the configuration module 710 can retrieve the departure time 230 with 50 instances of the user traveling to a dining facility at the departure time 230 of 1:00 PM. In this specific example, the configuration module 710 can further retrieve the departure time 230 with 25 instances of the user traveling to the dining facility at the departure time 230 of 1:15 PM. The configuration module 710 can compare the two instances of the departure time 230 of the user traveling to the dining facility to determine the 1:00 PM as the predicted dining time 442 based on the 1:00 PM being the departure time 230 most often traveled by the user.

Continuing in this specific example, the current time 212 can be 11:45 AM and the trigger-detector module 720 can thereafter monitor the current time 212 as the time elapses. The trigger-detector module 720 can detect the time overlap 452 between the current time 212 and the predicted dining time 442 at 1 hour and 15 minutes later to detect the user specific trigger 440 at 1:00 PM.

In another example, the trigger-detector module 720 can retrieve the past dining time 308 of the user arriving at a diner from the first storage unit 614, the second device 106 through the first communication unit 616, or a combination thereof. In this example, the trigger-detector module 720 can compare the different instances of the past dining time 308 to determine the past dining time 308 most often arrived at the diner as the predicted dining time 442. The trigger-detector module 720 can compare the current time 212 and the predicted dining time 442 for the time overlap 452 to detect the user specific trigger 440.

For a specific example, the configuration module 710 can retrieve the past dining time 308 with 50 instances of the user arriving at the diner at the past dining time 308 of 6:00 PM. In this specific example, the configuration module 710 can further retrieve the past dining time 308 with 25 instances of the user traveling to the dining facility at the past dining time 308 of 7:15 PM. The configuration module 710 can compare the two instances of the past dining time 308 to determine the 6:00 PM as the predicted dining time 442 based on the 6:00 PM being the time when the user most often arrived at the diner.

Continuing in this specific example, the current time 212 can be 5:30 PM and the trigger-detector module 720 can thereafter monitor the current time 212 as time passes. The trigger-detector module 720 can detect the time overlap 452 between the current time 212 and the predicted dining time 442 30 minutes later to detect the user specific trigger 440 at 6:00 PM.

In another example, the trigger-detector module 720 can compare the departure time 230 and the current time 212 to detect the user specific trigger 440 representing the predicted destination 444. For example, the configuration module 710 can retrieve the past trip 306 from the first storage unit 614, the second device through the first communication unit 616, or a combination thereof. Continuing in this example, the configuration module 710 can determine the destination point 226 based on the physical location 210 most often traveled in the past trip 306 from the current location 208 during the same time of the day as the predicted destination 444.

For a specific example, the trigger-detector module 720 can retrieve the San Francisco Ferry Building located in San Francisco, Calif. as the destination point 226 traveled by the user 50 times at the departure time 230 of 07:00 AM from the current location 208. In the same specific example, the trigger-detector module 720 can retrieve the St. Ignatius Church located in San Francisco, Calif. as the past trip 306 traveled 15 times by the user at the departure time 230 of 07:00 AM from the current location 208. In this specific example, the trigger-detector module 720 can compare the number of times the user traveled to the Ferry Building and the St. Ignatius church to determine the predicted destination 444. Continuing in this specific example, the trigger-detector module 720 can determine the San Francisco Ferry Building as the predicted destination 444 based on its departure time 230 of 7:00 AM from the past trip 306 being traveled most often.

Continuing in this specific example, the current time 212 can be 06:30 AM. In this specific example, the trigger-detector module 720 can monitor the current time 212 to compare the current time 212 with the departure time 230 of 7:00 AM. As the time passes, the trigger-detector module 720 can determine the time overlap 452 occurring 30 minutes after 6:30 AM at 7:00 AM to detect the user specific trigger 440 representing the predicted destination 444.

In a different example, the trigger-detector module 720 can detect the user specific trigger 440 based on the context information 202 meeting the cue condition 404 representing the dangerous road ahead 446 of FIG. 4. For example, the trigger-detector module 720 can detect the user specific trigger 440 based on the accident avoidance preference 312, the accident number threshold 314, the accident likelihood threshold 316, or a combination thereof.

For example, the trigger-detector module 720 can retrieve the number of vehicles involved in the accident along the drive route 222, the path 218 ahead of the user of the first device 102, the projected route 248, or a combination thereof from the second device 106 through the first communication unit 616. In this example, the trigger-detector module 720 can retrieve the accident avoidance preference 312 from the configuration module 710. For clarity and brevity, the example below will be described with the accident avoidance preference 312 of HIGH and LOW. However, the accident avoidance preference 312 is not limited to these two and can be described in more detail such as HIGH, MEDIUM, LOW, or with a specific value.

For example, the trigger-detector module 720 can determine the dangerous road ahead 446 based on the accident avoidance preference 312 of HIGH and a presence of an accident ahead of the user. For a specific example, the trigger-detector module 720 can retrieve the accident avoidance preference 312 of HIGH and two vehicles as the number of vehicles involved in an accident. In this example, based on the accident avoidance preference 312 of HIGH and the presence of an accident ahead of the user, the trigger-detector module 720 can determine the dangerous road ahead 446.

For a different example, the trigger-detector module 720 can determine the trigger event 402 representing the dangerous road ahead 446 based on the accident vehicle number 256 greater than the accident number threshold 314 and the accident avoidance preference 312 representing LOW. For a specific example, the trigger-detector module 720 can retrieve the accident number threshold 314 of three vehicles and the accident avoidance preference 312 of LOW. Continuing in this example, the trigger-detector module 720 can retrieve two vehicles as the number of vehicles involved in the accident along the drive route 222, the path 218 ahead of the user of the first device 102, the projected route 248, or a combination thereof. The trigger-detector module 720 can compare the accident number threshold 314 and the number of vehicles involved in the accident. Based on the accident avoidance preference 312 of LOW, the accident vehicle number 256 representing three vehicles, and the accident number threshold 314 representing two vehicles, the trigger-detector module 720 can determine the dangerous road ahead 446.

In a different example, the trigger-detector module 720 can retrieve the rate of accidents along the drive route 222, the path 218 ahead of the user, the projected route 248, or a combination thereof from the first storage unit 614, the second device through the first communication unit 616, or a combination thereof. In this example, the trigger-detector module 720 can determine the dangerous road ahead 446 based on the accident avoidance preference 312 of HIGH and any rate of accident above zero along the drive route 222, the path 218 ahead of the user of the first device 102, or a combination thereof.

For a specific example, the trigger-detector module 720 can retrieve the accident avoidance preference 312 of HIGH and two accidents per month as the rate of accidents. In this specific example, the trigger-detector module 720 can determine the dangerous road ahead 446 based on the accident avoidance preference 312 of HIGH and the rate of accident greater than zero along the drive route 222, the path 218 ahead of the user, or a combination thereof.

In a different example, the trigger-detector module 720 can determine the dangerous road ahead 446 based on the accident avoidance preference 312 of LOW and the rate of accident occurring greater than the accident likelihood threshold 316 along the drive route 222, the path 218 ahead of the user of the first device 102, the projected route 248, or a combination thereof. For a specific example, the trigger-detector module 720 can retrieve the accident likelihood threshold 316 of four per month, the accident avoidance preference 312 of LOW, the rate of accidents occurring of two per month, or a combination thereof along the drive route 222.

Continuing in this specific example, the trigger-detector module 720 can compare the accident likelihood threshold 316 and the rate of accidents occurring per month. Based on this comparison, the trigger-detector module 720 would not detect the dangerous road ahead 446 since the accident avoidance preference 312 is LOW and the accident likelihood threshold 316 of four per month is greater than the rate of two accidents per month along the drive route 222. For an alternative example, based on the previous specific example, if the rate of accidents occurring is six accidents per month, the trigger-detector module 720 can detect the user specific trigger 440 representing the dangerous road ahead 446 since the six accidents occurring per month is greater than the accident likelihood threshold 316 of four per month.

Alternatively, the trigger-detector module 720 can determine the dangerous road ahead 446 based on the projected route 258, the current location 208, or a combination thereof. In this example, the trigger-detector module 720 can retrieve the projected route 258 from the configuration module 710. Continuing in this example, the trigger-detector module 720 can retrieve the accident number threshold 314, the accident vehicle number 256, the physical location 210 of the accident, or a combination thereof from the configuration module 710.

Continuing further in this example, the trigger-detector module 720 can compare the physical location 210 of the accident and the projected route 258 to determine the location overlap 406. For the instance of the accident where the location overlap 406 is determined, the trigger-detector module 720 can compare the accident number threshold 314 and the accident vehicle number 256. Based on the comparison, the trigger-detector module 720 can determine the dangerous road ahead 446 based on the accident vehicle number 256 meeting or exceeding the accident number threshold 314.

In another example, the trigger-detector module 720 can detect the user specific trigger 440 based on determining the context information 202 meeting the cue condition 404 representing the undesired speed ahead 448 of FIG. 4. For example, the trigger-detector module 720 can determine the undesired speed ahead 448 based on the speed preference 318, the traffic speed threshold 320, the traffic speed 240, or a combination thereof. In this example, the trigger-detector module 720 can compare the speed preference 318 and the traffic speed 240 to detect the user specific trigger 440. Continuing in this example, the trigger-detector module 720 can determine context information 202 meeting the undesired speed ahead 448 based on determining a discrepancy between the speed preference 318 and the traffic speed 240.

For example, the trigger-detector module 720 can compare the quality of the speed preference 318 and the quality of the traffic speed 240 of the drive route 222, the path 218 ahead of the user of the first device 102, or a combination thereof to determine the user specific trigger 440. In this example, the trigger-detector module 720 can determine the quality of the traffic speed 240 based on comparing the traffic speed 240 and the traffic speed threshold 320. For example, the trigger-detector module 720 can determine the quality of the traffic speed 240 as FAST if the traffic speed 240 is equal to or faster than the traffic speed threshold 320. In a different example, the trigger-detector module 720 can determine the quality of the traffic speed 240 as SLOW if the traffic speed 240 is slower than the traffic speed threshold 320.

The trigger-detector module 720 can determine the undesired speed ahead 448 based on the combination of the speed preference 318 of FAST and the traffic speed 240 of SLOW. In another example, the trigger-detector module 720 can determine the undesired speed ahead 448 based on the combination of the speed preference 318 of SLOW and the traffic speed 240 of FAST.

For a specific example, the trigger-detector module 720 can retrieve the speed preference 318 of FAST, the traffic speed threshold 320 of 60 MPH, the traffic speed 240 of 50 MPH, or a combination thereof. In this specific example, the trigger-detector module 720 can compare the traffic speed 240 and the traffic speed threshold 320 to determine the quality of the traffic speed 240 as SLOW. Continuing in this specific example, the trigger-detector module 720 can compare and determine a discrepancy between the speed preference 318 of FAST and the traffic speed 240 of SLOW. Based on this discrepancy, the trigger-detector module 720 can detect the user specific trigger 440 based on the context information 202 meeting the cue condition 404 representing the undesired speed ahead 448.

For a different specific example, the trigger-detector module 720 can retrieve the speed preference 318 of SLOW, the traffic speed threshold 320 of 60 MPH, the traffic speed 240 of 50 MPH, or a combination thereof. Based on the comparison between the traffic speed 240 of 50 MPH and the traffic speed threshold 320 of 60 MPH, the trigger-detector module 720 can determine the traffic speed 240 of SLOW. Continuing in this example, the trigger-detector module 720 can compare the speed preference 318 of SLOW and the traffic speed 240 of SLOW. In this specific example, since the traffic speed 240 matches the speed preference 318, the trigger-detector module 720 would not detect the undesired speed ahead 448.

In another example, the trigger-detector module 720 can detect the user specific trigger 440 based on the context information 202 meeting the cue condition 404 representing the event approaching 450 of FIG. 4. In this example, the trigger-detector module 720 can detect the user specific trigger 440 based on determining the event approaching 450.

For example, the trigger-detector module 720 can retrieve the event schedule 322 including the event time 324 from the first storage unit 614, the second device 106 through the first communication unit 616, or a combination thereof. Continuing in this example, the trigger-detector module 720 can compare the event time 324 and the current time 212 for a match to determine the time overlap 452 between the event time 324 and the current time 212 to detect the user specific trigger 440.

For a specific example, the trigger-detector module 720 can retrieve "Nov. 27, 2012, 09:00 AM" as the event time 324 included in the event schedule 322. Continuing in this specific example, the trigger-detector module 720 can determine "Nov. 27, 2012, 08:00 AM" as the current time 212. In this specific example, as the time elapse, the trigger-detector module 720 can compare the current time 212 and the event time 324 until the time overlap 452 is determined at 09:00 AM, 60 minutes after the initial comparison. Based on determining the time overlap 452 at 9:00 AM, the trigger-detector module 720 can detect the user specific trigger 440 based on the context information 202 meeting the cue condition 404 representing the event approaching 450.

The trigger-detector module 720 is not limited to determining the time overlap 452 between the event time 324 and the current time 212 for detecting the user specific trigger 440. For example, the trigger-detector module 720 can take into account of the driving time 232 to the event location 328 for comparing the current time 212 and the event time 324.

For a specific example, the driving time 232 to the event location 328 can be 15 minutes. Continuing in this example, the event time 324 and the current time 212 can be 09:00 AM and 08:00 AM, respectively. In this example, the trigger-detector module 720 can subtract the driving time 232 of 15 minutes from the event time 324 to determine 08:45 AM PST as the new instance of the event time 324. The trigger-detector module 720 in this example can determine the time overlap 452 to determine event approaching 450 when the current time 212 reaches 08:45 AM. The trigger-detector module 720 can communicate the trigger event 402 and the cue condition 404 satisfied for detecting the trigger event 402 to a generator module 730.

The navigation system 100 can include the generator module 730, which can couple to the trigger-detector module 720. The generator module 730 generates the system initiated inquiry 508 of FIG. 5. For example, the generator module 730 can generate the system initiated inquiry 508 based on the detection of the trigger event 402, the cue condition 404 satisfied for detecting the trigger event 402, the message template 506 of FIG. 5 included in the initiating question database 504 of FIG. 5, or a combination thereof.

For example, based on detecting the trigger event 402, the generator module 730 can search for the message template 506. In one example, the generator module 730 can search the initiating question database 504 for the message template 506. In this example, the generator module 730 can retrieve the message template 506 linked to the cue condition 404 satisfied for detecting the trigger event 402 from the initiating question database 504. In this example, the generator module 730 can search the initiating question database 504 stored in the first storage unit 614, retrieve from the second device 106 through the first communication unit 616, or a combination thereof. Based on the retrieved instance of the message template 506, the generator module 730 can generate the system initiated inquiry 508.

The generator module 730 can search the initiating question database 504 for the message template 506 linked to the cue condition 404 satisfied for detecting the trigger event 402 representing the network sourced trigger 408. For example, the generator module 730 can search the initiating question database 504 to retrieve the message template 506 linked to the cue condition 404 representing the emergency situation 410.

For a specific example, the generator module 730 can search the initiating question database 504 to retrieve the message template 506 linked to the cue condition 404 representing the emergency situation 410 representing a vehicle with the airbag deploying ahead of the user. In this specific example, the generator module 730 can retrieve "There is a vehicle with an airbag deployed ahead. Would you like to search for a new route?" representing the message template 506. Based on the message template 506, the generator module 730 can generate the system initiated inquiry 508 presenting "There is a vehicle with an airbag deployed ahead. Would you like to search for a new route?"

It has been discovered that the navigation system 100 generating the system initiated inquiry 508 based on satisfying the cue condition 404 representing the emergency situation 410 improves the functionality of the navigation system 100. For example, by generating the system initiated inquiry 508 based on satisfying the cue condition 404 representing the emergency situation 410, the navigation system 100 can reduce an unnecessary operation of generating the system initiated inquiry 508 irrelevant to the user. By reducing the unnecessary operation of generating the system initiated inquiry 508, the navigation system 100 can reduce the overall process imposed on the first device 102. By reducing the overall process imposed on the first device 102, the navigation system 100 can allocate the saved processing power to other function, reduce the energy consumption to extend the operation life of the navigation system 100, or a combination thereof.

It has also been discovered that the navigation system 100 generating the system initiated inquiry 508 based on satisfying the cue condition 404 representing the emergency situation 410 improves the safety of operating the first device 102. For example, by promptly communicating the existence of the emergency situation 410 along the path 218 ahead of the user of the first device 102, the drive route 222, the projected route 248, or a combination thereof, the user can decide whether to continue or search for an alternate instance of the path 218. As a result, the navigation system 100 can improve the safety of the user of the first device 102 by providing an opportunity for the user to avoid driving through a dangerous condition.

In another specific example, the generator module 730 can search the initiating question database 504 for the message template 506 linked to the cue condition 404 representing the traffic speed change 414 based on the traffic speed 240 slowing down. In this specific example, the generator module 730 can retrieve "There is a potential traffic jam ahead. Would you like to search for a new route?" representing the message template 506 linked to the traffic speed change 414. Based on this message template 506, the generator module 730 can generate the system initiated inquiry 508 presenting "There is a potential traffic jam ahead. Would you like to search for a new route?"

In a different specific example, the generator module 730 can search the initiating question database 504 for the message template 506 linked to the cue condition 404 representing the traffic speed change 414 based on the traffic speed 240 speeding up. In this specific example, the generator module 730 can retrieve "The traffic jam will be clearing ahead. Would you like to contact your destination or notify the destination of your updated arrival time?" representing the message template 506 linked to the traffic speed change 414. Based on the message template 506, the generator module 730 can generate the system initiated inquiry 508 presenting "The traffic jam will be clearing ahead. Would you like to contact your destination or notify the destination of your updated arrival time?"

In an alternative example, the generator module 730 can search the initiating question database 504 for the message template 506 linked to the cue condition 404 representing the weather condition 416. For a specific example, the generator module 730 can search the initiating question database 504 for the message template 506 linked to the cue condition 404 representing the weather condition 416 based on the snow falling. In this specific example, the generator module 730 can retrieve "It is snowing ahead on your current path. Would you like to search for a new route to the destination?" representing the message template 506 linked to the weather condition 416 of snow fall for generating the system initiated inquiry 508. Based on the message template 506, the generator module 730 can generate the system initiated inquiry 508 presenting "It is snowing ahead on your current path. Would you like to search for a new route to the destination?"

In another example, the generator module 730 can search the initiating question database 504 based on detecting the message template 506 linked to the cue condition 404 representing the construction condition 418. In this specific example, the generator module 730 can retrieve "There is a construction ahead. Would you like to search for a new route?" representing the message template 506. Based on the message template 506, the generator module 730 can generate the system initiated inquiry 508 presenting "There is a construction ahead. Would you like to search for a new route?"

It has been discovered that the navigation system 100 generating the system initiated inquiry 508 based on satisfying the cue condition 404 representing the construction condition 418 improves the functionality of the navigation system 100. For example, by generating the system initiated inquiry 508 based on satisfying the cue condition 404 representing the construction condition 418, the navigation system 100 can reduce the unnecessary operation of generating the system initiated inquiry 508 the navigation system 100 can reduce the overall process imposed on the first device 102. By reducing the overall process imposed on the first device 102, the navigation system 100 can allocate the saved processing power to other function, reduce the energy consumption to extend the operation life of the navigation system 100, or a combination thereof.

It has also been discovered that the navigation system 100 generating the system initiated inquiry 508 based on satisfying the cue condition 404 representing the construction on route 418 improves the safety of operating the first device 102. For example, the driving lane near the construction site can be narrower, reduced in number of drivable lanes, or a combination thereof creating a hazardous driving condition. This invention can improve the safety of the user by providing an opportunity to avoid driving through the path 218 where the construction is ongoing to search for a new route.

For another specific example, the generator module 730 can search the initiating question database 504 for the message template 506 linked to the cue condition 404 satisfied for detecting the movement trigger 422. For a specific example, the generator module 730 can search the initiating question database 504 for the message template 506 linked to the cue condition 404 representing the free movement 424.

In this specific example, the generator module 730 can retrieve "You didn't designate a destination for travel. Would you like to enter one?" representing the message template 506 linked to the free movement 424. Based on this message template 506, the generator module 730 can generate the system initiated inquiry 508 presenting "You didn't designate a destination for travel. Would you like to enter one?"

It has been discovered that the navigation system 100 generating the system initiated inquiry 508 based on satisfying the cue condition 404 representing the free movement 424 improves the functionality of the navigation system 100. For example, by generating the system initiated inquiry 508 based on satisfying the cue condition 404 representing the free movement 424, the navigation system 100 can reduce an unnecessary operation of generating the system initiated inquiry 508 irrelevant to the user. By reducing the unnecessary operation of generating the system initiated inquiry 508, the navigation system 100 can reduce the overall process imposed on the first device 102. By reducing the overall process imposed on the first device 102, the navigation system 100 can allocate the saved processing power to other function, reduce the energy consumption to extend the operation life of the navigation system 100, or a combination thereof.

It has also been discovered that the navigation system 100 generating the system initiated inquiry 508 based on satisfying the cue condition 404 representing the free movement 424 improves the efficiency of operating the first device 102. For example, the user can forget to enter the destination point 226 into the navigation system 100 and start driving. In the case that the user have forgotten to input the destination point 226, the user will now be required to start the entry procedure of inputting the destination point 226 into the navigation system 100. Such a procedure for the user while driving can be very dangerous. By reminding the user the lack of the destination point 226 set and querying whether to input the destination point 226, the need for the user to manually start the entry procedure of the destination point 226 can be eliminated. As a result, the navigation system 100 can improve the efficiency by removing the unnecessary procedure of operating the navigation system 100 to start the entry procedure of the destination point 226.

For a different specific example, the generator module 730 can search for the message template 506 linked to the cue condition 404. One example is for the generator module 730 to search the initiating question database 504 for the message template 506 linked to the cue condition 404 representing the leaving destination 426. In this specific example, the generator module 730 can retrieve "Would you like to leave a review of the business you just left?" representing the message template 506. Based on the message template 506, the generator module 730 can generate the system initiated inquiry 508 presenting "Would you like to leave a review of the business you just left?"

It has been discovered that the navigation system 100 generating the system initiated inquiry 508 based on satisfying the cue condition 404 representing the leaving destination 426 improves the functionality of the navigation system 100. For example, by generating the system initiated inquiry 508 based on satisfying the cue condition 404 representing the leaving destination 426, the navigation system 100 can reduce an unnecessary operation of generating the system initiated inquiry 508 irrelevant to the user. By reducing the unnecessary operation of generating the system initiated inquiry 508, the navigation system 100 can reduce the overall process imposed on the first device 102. By reducing the overall process imposed on the first device 102, the navigation system 100 can allocate the saved processing power to other function, reduce the energy consumption to extend the operation life of the navigation system 100, or a combination thereof.

It has been discovered that the navigation system 100 generating the system initiated inquiry 508 based on determining the contextual information 202 satisfying the cue condition 404 representing the leaving destination 426 and generating the system initiated inquiry 508 improves the probability of the user receiving an inquiry for review and rating. For example, based on detecting the first device 102 moving away from the POI at the destination point 226 such as a restaurant, the first device 102 can ask the user to provide a review of the dining experience. Traditionally, the POI at the destination point 226 have sent inquiry for review and rating of the experience based on a phone number, a physical address, or an email provided by the user. In this traditional way, the inquiry for review and rating would not be received by the user if the phone number, the physical address, or the email is not provided by the user. In addition, in the traditional way, the inquiry for review and rating would also not be received by the user if the user do not have the phone turned on, have moved away before receiving a mail, or the email server have not been accessed. As a result, by requesting review and rating to the user of the experience at the destination point 226 based on the leaving destination 426, the navigation system 100 can improve the probability of the user receiving the inquiry for review and rating.

For a different specific example, the generator module 730 can search the initiating question database 504 for the message template 506 linked to the cue condition 404 representing the low fuel 428. In this specific example, the generator module 730 can retrieve "Your fuel is running low. Would you like to search for a gas station or a charging station to re-fuel or recharge?" representing the message template 506. Based on the message template 506, the generator module 730 can generate the system initiated inquiry 508 presenting "Your fuel is running low. Would you like to search for a gas station or a charging station to re-fuel or recharge?" Further, for a vehicle running in the V2G system, the generator module 730 can alternatively retrieve "Your charge is running low. Would you like to continue using the current power provider or search for an alternate power provider?" representing the message template 506. Based on the message template 506, the generator module 730 can generate the system initiated inquiry 508 presenting "Your charge is running low. Would you like to continue using the current power provider or search for an alternate power provider?"

For another specific example, the generator module 730 can search the initiating question database 504 for the message template 506 linked to the cue condition 404 representing the destination approaching 430. In this specific example, the generator module 730 can retrieve "You are nearing your destination. Would you like to call or notify the destination that you're arriving soon?" representing the message template 506. Based on this message template 506, the generator module 730 can generate the system initiated inquiry 508 presenting "You are nearing your destination. Would you like to call or notify the destination that you're arriving soon?"

It has been discovered that the navigation system 100 generating the system initiated inquiry 508 based on determining the context information 202 satisfying the cue condition 404 representing the destination approaching 430 improves the functionality of the navigation system 100. For example, by generating the system initiated inquiry 508 based on satisfying the cue condition 404 representing the destination approaching 430, the navigation system 100 can reduce an unnecessary operation of generating the system initiated inquiry 508 irrelevant to the user. By reducing the unnecessary operation of generating the system initiated inquiry 508, the navigation system 100 can reduce the overall process imposed on the first device 102. By reducing the overall process imposed on the first device 102, the navigation system 100 can allocate the saved processing power to other function, reduce the energy consumption to extend the operation life of the navigation system 100, or a combination thereof.

It has also been discovered that the navigation system 100 generating the system initiated inquiry 508 based on determining the contextual information 202 satisfying the cue condition 404 representing the destination approaching 430 and generating the system initiated inquiry 508 improves the speed of operating the first device 102. For example, the user may wish to notify the POI at the destination point 226 by initiating a communication session or by sending a notification message. In this example, based on determining the first device 102 approaching and nearing the destination point 226, the user can be automatically inquired whether to initiate the communication session or to send the notification message with the POI at the destination point 226. As a result, the navigation system 100 can improve the speed of operating the first device 102 by eliminating the step for the user to manually operate the first device 102 to initiate the communication session or to send the notification.

For an alternative specific example, the generator module 730 can retrieve "You are nearing your destination. Would you like to search for a parking space nearby?" representing the message template 506. Based on this message template 506, the generator module 730 can generate the system initiated inquiry 508 presenting "You are nearing your destination. Would you like to search for a parking space nearby?"

For a different example, the generator module 730 can search the initiating question database 504 for the message template 506 linked to the cue condition 404 representing the turn nearby 436. In this example, the generator module 730 can retrieve "You are nearing a turn. Please make sure to use your turn signal when turning" representing the message template 506 linked to the cue condition 404 representing the turn nearby 436 from the initiating question database 504. Based on this message template 506, the generator module 730 can generate the system initiated inquiry 508 presenting "You are nearing a turn. Please make sure to use your turn signal when turning."

For another example, the generator module 730 can search the initiating question database 504 for the message template 506 linked to the cue condition 404 satisfied for detecting the user specific trigger 440. For a specific example, the generator module 730 can search the initiating question database 504 for the message template 506 linked to the cue condition 404 representing the predicted dining time 442.

In this specific example, the generator module 730 can retrieve "It's almost your usual lunch time. Would you like to find a dining facility?" representing the message template 506. Based on the message template 506, the generator module 730 can generate the system initiated inquiry 508 presenting "It's almost your usual lunch time. Would you like to find a dining facility?"

For another specific example, the generator module 730 can search the initiating question database 504 for the message template 506 linked to the cue condition 404 representing the predicted destination 444. In this specific example, the generator module 730 can retrieve "I see you are heading in the direction you previously visited. Would you like to make it your current destination?" representing the message template 506. Based on the message template 506, the generator module 730 can generate the system initiated inquiry 508 presenting "I see you are heading in the direction you previously visited. Would you like to make it your current destination?"

It has been discovered that the navigation system 100 generating the system initiated inquiry 508 based on determining the context information 202 satisfying the cue condition 404 representing the predicted destination 444 improves the functionality of the navigation system 100. For example, by generating the system initiated inquiry 508 based on satisfying the cue condition 404 representing the predicted destination 444, the navigation system 100 can reduce an unnecessary operation of generating the system initiated inquiry 508 irrelevant to the user. By reducing the unnecessary operation of generating the system initiated inquiry 508, the navigation system 100 can reduce the overall process imposed on the first device 102. By reducing the overall process imposed on the first device 102, the navigation system 100 can allocate the saved processing power to other function, reduce the energy consumption to extend the operation life of the navigation system 100, or a combination thereof.

It has also been discovered that the navigation system 100 generating the system initiated inquiry 508 based on determining the contextual information 202 satisfying the cue condition 404 representing the predicted destination 444 can predict of the traffic delay between the current location 208 and the destination desired as the destination point 226 by the user. For example, there can be a traffic delay between the current location 208 and the destination point 226 through various times of the day. If the user travels to the predicted destination 444 such as a workplace without providing the physical location 210, the navigation system 100 not using this technology cannot determine the projected route 248 for predicting the presence of the traffic delay. As a result, by predicting the presence of the traffic delay along the projected route 248, the navigation system 100 can generate a system initiated inquiry 404 providing a notice of the potential traffic delay and inquire whether an alternate route should be searched without the user initiating this process, thereby improving its efficiency.

In a further specific example, the generator module 730 can search the initiating question database 504 for the message template 506 linked to the cue condition 404 representing the dangerous road ahead 446. In this specific example, the generator module 730 can retrieve "The path you are currently driving has accidents occurring frequently. Would you like to search for an alternate route?" representing the message template 506 from the initiating question database 504. Based on the message template 506, the generator module 730 can generate the system initiated inquiry 508 presenting "The path you are currently driving has accidents occurring frequently. Would you like to search for an alternate route?"

It has been discovered that the navigation system 100 generating the system initiated inquiry 508 based on the context information 202 satisfying the cue condition 404 representing the dangerous road ahead 446 improves the functionality of the navigation system 100. For example, by generating the system initiated inquiry 508 based on satisfying the cue condition 404 representing the dangerous road ahead 446, the navigation system 100 can reduce an unnecessary operation of generating the system initiated inquiry 508 irrelevant to the user. By reducing the unnecessary operation of generating the system initiated inquiry 508, the navigation system 100 can reduce the overall process imposed on the first device 102. By reducing the overall process imposed on the first device 102, the navigation system 100 can allocate the saved processing power to other function, reduce the energy consumption to extend the operation life of the navigation system 100, or a combination thereof.

It has also been discovered that the navigation system 100 generating the system initiated inquiry 508 based on the contextual information 202 satisfying the cue condition 404 representing the dangerous road ahead 446 and generating the system initiated inquiry 508 improves the safety of operating the first device 102. For example, based on determining the dangerous road ahead 446, the first device 102 can automatically inquire the user whether to search for an alternate route. As a result, the navigation system 100 can improve the safety of operating the first device 102 by providing early warning to the user who may lack the skill to drive an accident prone street or streets with drivers often causing an accident and inquire whether to look for an alternate route.

In a further specific example, the generator module 730 can search the initiating question database 504 for the message template 506 linked to the cue condition 404 representing the undesired speed ahead 448. In this specific example, the generator module 730 can retrieve "The traffic of your current path seems too fast or too slow compared to your preferred speed. Would you like to search for an alternate route?" representing the message template 506 from the initiating question database 504. Based on the message template 506, the generator module 730 can generate the system initiated inquiry 508 presenting "The traffic of your current path seems too fast or too slow compared to your preferred speed. Would you like to search for an alternate route?"

In another specific example, the generator module 730 can search the initiating question database 504 for the message template 506 linked to the cue condition 404 representing the event approaching 450. In this specific example, the generator module 730 can consider the driving time 232 required to reach the destination point 226 for searching the initiation question database 504 for the cue condition 404 representing the event approaching 450. Continuing in this specific example, the generator module 730 can retrieve "Your next scheduled event is coming up. Would you like to know your stored schedule and make it your destination?" representing the message template 506 from the initiating question database 504. Based on the message template 506, the generator module 730 can generate the system initiated inquiry 508 presenting "Your next scheduled event is coming up. Would you like to know your stored schedule and make it your destination?"

It has been discovered that the navigation system 100 generating the system initiated inquiry 508 based on the context information 202 satisfying the cue condition 404 representing the event approaching 450 considering the driving time 232 improves the functionality of the navigation system 100. For example, by generating the system initiated inquiry 508 based on satisfying the cue condition 404 representing the event approaching 450 considering the driving time 232, the navigation system 100 can reduce an unnecessary operation of generating the system initiated inquiry 508 irrelevant to the user. By reducing the unnecessary operation of generating the system initiated inquiry 508, the navigation system 100 can reduce the overall process imposed on the first device 102. By reducing the overall process imposed on the first device 102, the navigation system 100 can allocate the saved processing power to other function, reduce the energy consumption to extend the operation life of the navigation system 100, or a combination thereof.

It has also been discovered that the navigation system 100 generating the system initiated inquiry 508 based on the contextual information 202 satisfying the cue condition 404 representing the event approaching 450 considering the driving time 232 improves the speed of operating the vehicle with the first device 102. For example, traditionally, in order to accurately receive the notification at the departure time 230 for arriving at the even time 324, the user must continuously operate the first device 102 to determine the specific amount of time required to reach the destination point 226 since the driving time 232 can change throughout the day. Using the inventive technology, based on the contextual information 202 satisfying the cue condition 404 representing the event approaching 450, the user can continuously receive the departure time 230 for reaching the destination point 226 on time. As a result, the navigation system 100 can improve the speed of operating the vehicle with the first device 102 by removing the step of determining the time required to reach the destination point 226. The generator module 730 can communicate the system initiated inquiry 508 to a prompt module 740.

The navigation system 100 can include the prompt module 740, which can couple to the generator module 730. The prompt module 740 prompts the system initiated inquiry 508. The prompt module 740 can prompt the system initiated inquiry 508 in various ways. For example, the prompt module 740 can prompt the system initiated inquiry 508 through the first user interface 618 such as a speaker, a display monitor, or a combination thereof.

For a specific example, the prompt module 740 can prompt the system initiated inquiry 508 by outputting the system initiated inquiry 508 as an audio message through a speaker. In a different specific example, the prompt module 740 can prompt the system initiated inquiry 508 by displaying the system initiated inquiry 508 as an image, a text, or a combination thereof on a display monitor. In another specific example, the prompt module 740 can prompt the system initiated inquiry 508 by a physical motion such as a vibration. In these examples, the prompt module 740 can prompt the system initiated inquiry 508 after receiving the system initiated inquiry 508 from the generator module 730.

The prompt module 740 can prompt the system initiated inquiry 508 in various ways. For example, the prompt module 740 can receive and prompt the system initiated inquiry 508 simultaneously. In this example, the prompt module 740 can prompt the system initiated inquiry 508 while receiving the system initiated inquiry 508 from the generator module 730.

In another example, the prompt module 740 can prompt the system initiated inquiry 508 after receiving the entire parts of the system initiated inquiry 508. In this example, the prompt module 740 can prompt the system initiated inquiry 508 after the system initiated inquiry 508 is completely received from the generator module 730. The prompt module 740 can communicate the system initiated inquiry 508 to a mode module 750.

The navigation system 100 can include the mode module 750, which can couple to the prompt module 740. The mode module 750 can determine the operation mode 510 of FIG. 5 of the navigation system 100 for receiving the operation input 516 of FIG. 5.

The mode module 750 can determine the operation mode 510 of the navigation system 100 in various ways. For example, the mode module 750 can determine the operation mode 510 based on retrieving the operation mode 510 from the first communication unit 616, the second device 106 through the first user interface 618, or a combination thereof. In this example, the mode module 750 can receive the operation mode 510 representing the wait mode 512 of FIG. 5, the listen mode 514 of FIG. 5, or a combination thereof from the user of the first device 102. In a different example, the mode module 750 can receive the operation mode 510 representing the wait mode 512, the listen mode 514, or a combination thereof from the first storage unit 614.

In another example, the mode module 750 can determine the operation mode 510 of the navigation system 100 based on the trigger-detector module 720 detecting the trigger event 402. For example, the operation mode 510 can initially be pre-configured to the wait mode 512 as a default mode of the navigation system 100. Continuing in this example, the mode module 750 can receive the detection of the trigger event 402 from the trigger-detector module 720. Based on detecting the trigger event 402, the mode module 750 can change the operation mode 510 of the first device 102 from the wait mode 512 to the listen mode 514. The default mode of the navigation system 100 is not limited to the wait mode 512 and can be pre-configured to other instance of the operation mode 510 tailored to the user. For example, the default mode of the navigation system 100 can be pre-configured to the listen mode 512.

In a further example, the mode module 750 can determine the operation mode 510 of the navigation system 100 based on the prompt module 740 prompting the system initiated inquiry 508. For example, the operation mode 510 can be pre-configured to the wait mode 512 as a default mode of the navigation system 100. Continuing in this example, the mode module 750 can detect the prompting of the system initiated inquiry 508 by receiving the system initiated inquiry 508 from the prompt module 740. Based on detecting the prompt of the system initiated inquiry 508, the mode module 750 can switch the operation mode 510 of the first device 102 from the wait mode 512 to the listen mode 514.

In these examples, the navigation system 100 in the listen mode 514 can monitor for the operation input 516 provided by the user through the first user interface 618. In a different example, the first device 102 in the wait mode 512 can refrain from monitoring the operation input 516 through the first user interface 618, ignore the retrieved instance of the user input 512, or a combination thereof.

It has been discovered that the navigation system 100 determining the operation mode 510 based on detecting the trigger event 402, prompting of the system initiated inquiry 508, or a combination thereof improves the efficiency and accuracy of the computer function of the navigation system 100. More specifically, by selecting the operation mode 510 based on detecting the trigger event 402, prompting the system initiated inquiry 508, or a combination thereof, the navigation system 100 can limit the first device 102 operating in the listen mode 514 to a time period, a duration, or a combination thereof tailored to the user needs. As a result, the navigation system 100 can improve the efficiency of the navigation system 100 by reducing the time period, the duration, or a combination thereof of capturing the operation input 516, thereby reducing the overall process imposed on the first device 102. By reducing the overall process imposed on the first device 102, the navigation system 100 can allocate the saved processing power to other function, reduce the energy consumption to extend the operation life of the navigation system 100, or a combination thereof.

Furthermore, by reducing the first device 102 operating in the listen mode 514 to the time period, the duration, or a combination thereof tailored to the user needs, the likelihood of the navigation system 100 capturing a false positive command instance of the operation input 516 can be reduced. As a result, the navigation system 100 can improve the efficiency of the navigation system 100 by avoiding executing the unnecessary operation and thereby reduce the overall process imposed on the first device 102. By reducing the overall process imposed on the first device 102, the navigation system 100 can allocate the saved processing power to other function, reduce the energy consumption to extend the operation life of the navigation system 100, or a combination thereof.

The physical transformation from a movement of the first device 102 such as the movement by a person carrying the first device 102, the vehicle equipped with the first device 102, or a combination thereof results in the movement in the physical world based on the operation of the navigation system 100. As the movement in the physical world occurs, the movement itself creates additional information that is converted back into generating the context information 202 including the current location 208, the user navigation history 304, the remaining distance 244, or a combination thereof for the continued operation of the navigation system 100 and to continue the movement in the physical world.

The first software 626 of FIG. 6 of the first device 102 of FIG. 6 can include the modules for the navigation system 100. For example, the first software 626 can include the configuration module 710, the trigger-detector module 720, the generator module 730, the prompt module 740, and the mode module 750.

The first control unit 612 of FIG. 6 can execute the first software 626 for the configuration module 710 to obtain the context information 202 and the user information 302. The first control unit 612 can execute the first software 626 for the trigger-detector module 720 to detect the trigger event 402. The first control unit 612 can execute the first software 626 for the generator module 730 to generate the system initiated inquiry 508. The first control unit 612 can execute the first software 626 for the prompt module 740 to prompt the system initiated inquiry 508. The first control unit 612 can execute the first software 626 for the mode module 750 to select the operation mode 510.

The second software 642 of FIG. 6 of the second device 106 of FIG. 6 can include the modules for the navigation system 100. For example, the second software 642 can include the configuration module 710, the trigger-detector module 720, the generator module 730, the prompt module 740 and the mode module 750.

The second control unit 634 of FIG. 6 can execute the second software 642 for the configuration module 710 to obtain the context information 202 and the user information 302. The second control unit 634 can execute the second software 642 for the trigger-detector module 720 to detect the trigger event 402. The first control unit 612 can execute the second software 642 for the generator module 730 to generate the system initiated inquiry 508. The first control unit 612 can execute the second software 642 for the prompt module 740 to prompt the system initiated inquiry 508. The first control unit 612 can execute the second software 642 for the mode module 750 to select the operation mode 510.

The modules of the navigation system 100 can be partitioned between the first software 626 and the second software 642. The second software 642 can include the trigger-detector module 720, the generator module 730, the prompt module 740, and the mode module 750. The second control unit 634 can execute modules partitioned on the second software 642 as previously described.

The first software 626 can include the configuration module 710. Based on the size of the first storage unit 614, the first software 626 can include additional modules of the navigation system 100. The first control unit 612 can execute the modules partitioned on the first software 626 as previously described.

The first control unit 612 can operate the first communication interface 628 of FIG. 6 to communicate the context information 202, the trigger event 402, the initiating question database 504, the system initiated inquiry 508, the operation mode 510, the operation input 516, or a combination thereof to or from the second device 106. The first control unit 612 can operate the first software 626 to operate the location unit 620.

The second control unit 634 can operate the second communication interface 650 of FIG. 6 to communicate the context information 202, the trigger event 402, the initiating question database 504, the system initiated inquiry 508, the operation mode 510, the operation input 516, or a combination thereof to or from the first device 102 through the communication path 104 of FIG. 6.

The first control unit 612 can operate the first user interface 618, the second user interface 638 of FIG. 6, or a combination thereof to display the map 216, the route information 220, the updating information 234, the user navigation history 304, a geographic region, or a combination thereof. More specifically, the first user interface 618, the second user interface 638, or a combination thereof can display the digital representation of the map 216, the route information 220, the updating information 234, the user navigation history 304, a geographic region, or a combination thereof to represent the physical world.

The navigation system 100 describes the module functions or order as an example. The modules can be partitioned differently. For example, the generator module 730 and the prompt module 740 can be combined. Each of the modules can operate individually and independently of the other modules. Furthermore, data generated in one module can be used by another module without being directly coupled to each other. For example, the generator module 730 can receive the construction location 236 from the configuration module 710. Further, "communicating" can represent sending, receiving, transmitting, or a combination thereof the data generated to or from one to another.

The modules described in this application can be hardware implementation or hardware accelerators in the first control unit 612 or in the second control unit 634. The modules can also be hardware implementation or hardware accelerators within the first device 102 or the second device 106 but outside of the first control unit 612 or the second control unit 634, respectively as depicted in FIG. 6. However, it is understood that the first control unit 612, the second control unit 634, or a combination thereof can collectively refer to all hardware accelerators for the modules.

The modules described in this application can be implemented as instructions stored on a non-transitory computer readable medium to be executed by the first control unit 612, the second control unit 634, or a combination thereof. The non-transitory computer medium can include the first storage unit 614 of FIG. 6, the second storage unit 646 of FIG. 6, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 8:
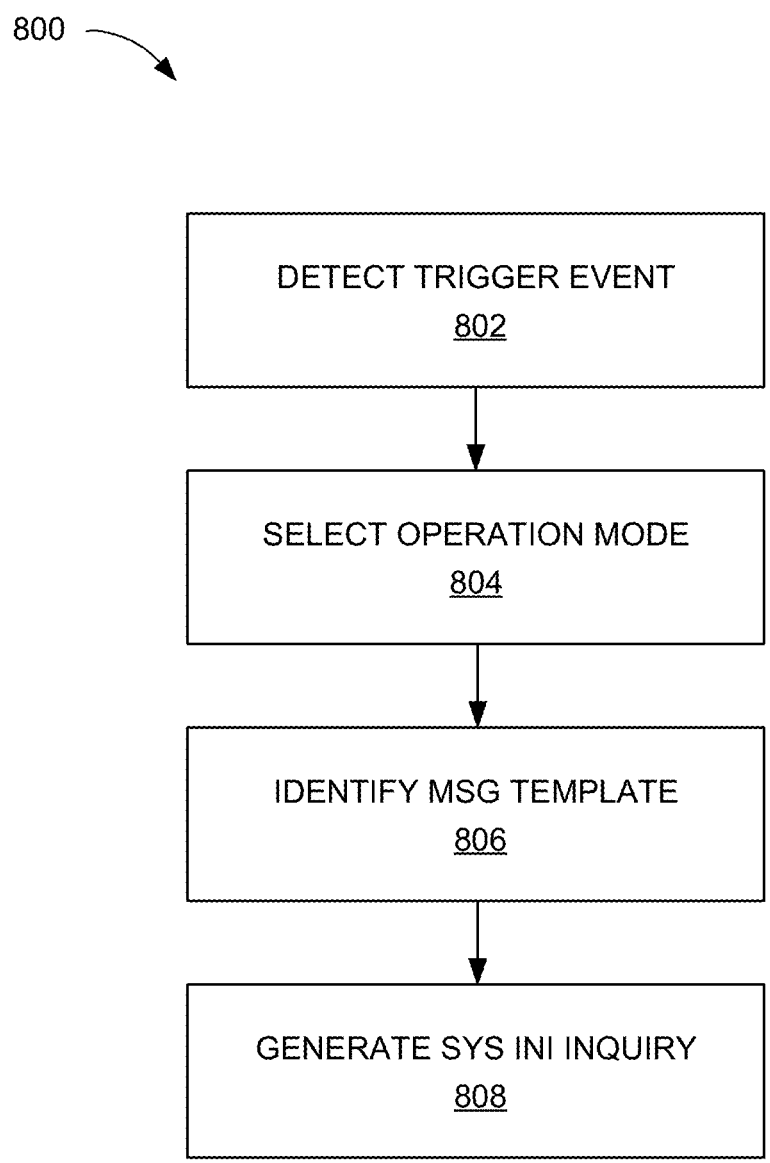
FIG. 8 is a flow chart of a method of operation of the navigation system in a further embodiment of the present invention.

Referring now to FIG. 8, therein is shown a flow chart of a method 800 of operation of the navigation system 100 in a further embodiment of the present invention. The method 800 includes: detecting a trigger event based on a context information being free of an operation input satisfying a cue condition in a block 802; selecting an operation mode representing a listen mode based on detecting the trigger event in a block 804; identifying a message template linked to the cue condition in a block 806; and generating a system initiated inquiry with a control unit based on the message template and the selection of the listen mode for presenting on a device in a block 808.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   detecting a trigger event based on a context information being free of an operation input satisfying a cue condition;
   selecting an operation mode representing a listen mode based on detecting the trigger event;
   identifying a message template linked to the cue condition; and
   generating a system initiated inquiry with a control unit based on the message template and the selection of the listen mode for presenting on a device.

2. The method as claimed in claim 1 wherein detecting the trigger event includes:
   determining a physical location from an emergency information;
   determining a projected route based on a drive route, a current location, a movement direction, a map, a past route, or a combination thereof;
   determining a location overlap based on comparing the physical location from the emergency information and the projected route; and
   determining an emergency situation as the trigger event based on the location overlap.

3. The method as claimed in claim 1 wherein detecting the trigger event includes:
   determining a fuel level threshold, a fuel remainder, or a combination thereof; and
   determining a low fuel as the trigger event based on the fuel remainder is below the fuel level threshold.

4. The method as claimed in claim 1 wherein detecting the trigger event includes:
   determining a travel movement based on detecting a change in a current location;
   determining a missing destination based on failing to detect a destination point from the route information; and
   determining a free movement as the trigger event based on the travel movement, the missing destination, or a combination thereof.

5. The method as claimed in claim 1 wherein detecting the trigger event includes:
   determining a projected route based on a current location, a drive route, a movement direction, a map, a past route, or a combination thereof.
   determining a location overlap based on comparing a construction location to the projected route; and determining a construction condition as the trigger event based on the location overlap.

6. The method as claimed in claim 1 wherein detecting the trigger event includes:
   detecting a location overlap between a current location and a destination point, and
   determining a leaving destination as the trigger event based on the current location diverting from the destination point.

7. The method as claimed in claim 1 wherein detecting the trigger event includes:
   determining a destination proximity threshold, a remaining distance, or a combination thereof; and
   determining a destination approaching as the trigger event based on the remaining distance meeting or is below the destination proximity threshold.

8. The method as claimed in claim 1 wherein detecting the trigger event includes;
   determining a projected route based on a current location, a drive route, a movement direction, a map, a past route, or a combination thereof;
   determining an accident number threshold, an accident vehicle number along the projected route, or a combination thereof;
   comparing the accident vehicle number and the accident number threshold; and
   determining a dangerous road ahead as the trigger event based on the accident vehicle number meeting or exceeding the accident number threshold.

9. The method as claimed in claim 1 wherein detecting the trigger event includes:
   determining a location overlap based on comparing a current location, a start point of a past route, or a combination thereof;
   determining a time overlap based on comparing a current time, a departure time of the past route, or a combination thereof; and
   determining a destination point of the past route as the predicted destination as the trigger event based on the location overlap, the time overlap, or a combination thereof.

10. The method as claimed in claim 1 wherein detecting the trigger event includes:
    generating a driving time based on a traffic speed to an event location, a remaining distance to the event location, or a combination thereof;
    determining a departure time based on incorporating the driving time to reach the event location at an event time; and
    determining an event approaching based on a current time meeting or passing the departure time, or a combination thereof.

11. A navigation system comprising:
    a control unit for;
    detecting a trigger event based on a context information being free of an operation input satisfying a cue condition,
    selecting an operation mode representing a listen mode based on detecting the trigger event,
    identifying a message template linked to the cue condition,
    generating a system initiated inquiry based on the message template and the selection of the listen mode, and
    a communication interface, coupled to the control unit, for communicating the system initiated inquiry for presenting on a device.

12. The system as claimed in claim 11 wherein the control unit is for detecting the trigger event includes:
    determining a physical location from an emergency information;
    determining a projected route based on a drive route, a current location, a movement direction, a map, a past route, or a combination thereof;
    determining a location overlap based on comparing the physical location from the emergency information and the projected route; and
    determining an emergency situation as the trigger event based on the location overlap.

13. The system as claimed in claim 11 wherein the control unit is for detecting the trigger event includes:
    determining a fuel level threshold, a fuel remainder, or a combination thereof; and
    determining a low fuel as the trigger event based on the fuel remainder is below the fuel level threshold.

14. The system as claimed in claim 11 wherein the control unit is for detecting the trigger event includes:
    determining a travel movement based on detecting a change in a current location;
    determining a missing destination based on failing to detect a destination point from the route information; and
    determining a free movement as the trigger event based on the travel movement, the missing destination, or a combination thereof.

15. The system as claimed in claim 11 wherein the control unit is for detecting the trigger event includes:
    determining a projected route based on a current location, a drive route, a movement direction, a map, a past route, or a combination thereof;
    determining a location overlap based on comparing a construction location to the projected route; and
    determining a construction condition as the trigger event based on the location overlap.

16. A non-transitory computer readable medium including instructions for execution, the instructions comprising:
    detecting a trigger event based on a context information being free of an operation input satisfying a cue condition;
    selecting an operation mode representing a listen mode based on detecting the trigger event;
    identifying a message template linked to the cue condition; and
    generating a system initiated inquiry based on the message template and the selection of the listen mode for presenting on a device.

17. The non-transitory computer readable medium as claimed in claim 16 wherein detecting the trigger event includes:
    determining a physical location from an emergency information;
    determining a projected route based on a drive route, a current location, a movement direction, a map, a past route, or a combination thereof;
    determining a location overlap based on comparing the physical location from the emergency information and the projected route; and
    determining an emergency situation as the trigger event based on the location overlap.

18. The non-transitory computer readable medium as claimed in claim 16 wherein detecting the trigger event includes:
    determining a fuel level threshold, a fuel remainder, or a combination thereof; and determining a low fuel as the trigger event based on the fuel remainder is below the fuel level threshold.

19. The non-transitory computer readable medium as claimed in claim 16 wherein detecting the trigger event includes:
   determining a travel movement based on detecting a change in a current location;
   determining a missing destination based on failing to detect a destination point from the route information; and
   determining a free movement as the trigger event based on the travel movement, the missing destination, or a combination thereof.

20. The non-transitory computer readable medium as claimed in claim 16 wherein detecting the trigger event includes:
   determining a projected route based on a current location, a drive route, a movement direction, a map, a past route, or a combination thereof;
   determining a location overlap based on comparing a construction location to the projected route; and
   determining a construction condition as the trigger event based on the location overlap.

\* \* \* \* \*